(12) United States Patent
Xuan et al.

(10) Patent No.: US 8,175,324 B2
(45) Date of Patent: May 8, 2012

(54) REVERSIBLE DATA HIDING

(75) Inventors: Guorong Xuan, Shanghai (CN); Yun-Qing Shi, Millburn, NJ (US)

(73) Assignee: New Jersey Institute of Technology, Newark, NJ (US)

( * ) Notice: Subject to any disclaimer, the term of this patent is extended or adjusted under 35 U.S.C. 154(b) by 873 days.

(21) Appl. No.: 12/253,825

(22) Filed: Oct. 17, 2008

(65) Prior Publication Data

US 2010/0098287 A1    Apr. 22, 2010

(51) Int. Cl.
*G06K 9/00* (2006.01)
(52) U.S. Cl. ........ 382/100; 382/232; 382/251; 382/169; 382/235; 382/248
(58) Field of Classification Search .................. 382/100, 382/232, 251, 169, 235, 162, 248
See application file for complete search history.

(56) References Cited

U.S. PATENT DOCUMENTS

| | | | | |
|---|---|---|---|---|
| 6,463,100 | B1 * | 10/2002 | Cho et al. | 375/240.03 |
| 6,975,733 | B1 * | 12/2005 | Choi et al. | 381/100 |
| 6,983,057 | B1 * | 1/2006 | Ho et al. | 382/100 |
| 7,280,669 | B2 * | 10/2007 | Choi et al. | 382/100 |
| 7,555,137 | B2 * | 6/2009 | Parisis et al. | 382/100 |
| 2005/0141747 | A1 * | 6/2005 | Shi et al. | 382/100 |
| 2006/0002584 | A1 * | 1/2006 | Lu | 382/100 |
| 2007/0189608 | A1 * | 8/2007 | Shi et al. | 382/224 |
| 2007/0258618 | A1 * | 11/2007 | Shi et al. | 382/100 |

OTHER PUBLICATIONS

Reversible Binary Image Data Hiding by Run Length Hisotgram Modification; Xuan et al ; Dec. 8, 2008.*
Reversible Data hiding ; Zhicheng et al; Mar. 2006.*
Shi, Y. Q. "Reversible data hiding" International Workshop on Digital watermarking (IWDW04), Seoul, Korea, Oct. 2004.
Tian, J. "Reversible data embedding using a difference expansion," IEEE Transaction on Circuits and Systems for Video Technology, 2003, 13 (8):890-896.
Alattar, A. M. "Reversible watermark using difference expansion of triplets," Proceeings of the International Conference on Image Processing, vol. 1, pp. 501-504, 2003.
Thodi et al.. "Reversible watermarking by prediction-error expansion," Proceedings of 6$^{th}$ IEE Southwest Symposium on Image Analysis and Interpretation, pp. 21-25, Lake Tahoe, CA, USA, Mar. 28-30, 2004.
Kamstra et al., "Reversible data embedding into images using wavelet techniques and sorting," IEEE Transactions on Image Processing, vol. 14, No. 12, pp. 2082-2090, Dec. 2005.

(Continued)

*Primary Examiner* — Vikkram Bali
*Assistant Examiner* — Nancy Bitar
(74) *Attorney, Agent, or Firm* — Dorsey & Whitney LLP

(57) ABSTRACT

Methods for reversible data hiding are disclosed herein. These methods may be applied to images for reversible image data hiding. In one embodiment, a method for reversible data hiding comprises identifying carrier data having a plurality of components and establishing prediction-errors for each of the components of the carrier data. A first threshold and a second threshold are established. The prediction-errors of the components are evaluated against the first threshold to identify components for possible hiding. The components identified for possible hiding are evaluated against the second threshold to identify components for hiding. To-be embedded data is embedded into the carrier data identified for hiding to create marked data. The marked data is evaluated for overflow or underflow. If overflow or underflow is detected, histogram modification is performed. Marked data is then established.

21 Claims, 15 Drawing Sheets

OTHER PUBLICATIONS

Lee et al. "Reversible image watermarking based on integer-to-integer wavelet transform," IEEE Transactions on Information Forensics and Security, vol. 2, issue 3, part 1, pp. 321-330, Sep. 2007.

Xuan et al. "Distortionless data hiding based on integer wavelet transform," IEE Electronics Letters, vol. 38, No. 25, pp. 1646-1648, Dec. 2002.

Xuan et al. "Lossless data hiding based on integer wavelet transform" IEEE International Workshop on Multimedia Signal Processing (MMSP02), St. Thomas, US Virgin Islands, Dec. 2002.

Xuan et al. "High capacity lossless data hiding algorithms," IEEE International Symposium on Circuits and Systems (ISCA04), May 2004, Vancouver, Canada.

Xuan et al. "Reversible Data Hiding Based on Wavelet Spread Spectrum," IEEE International Workshop on Multimedia Signal Processing (MMSP04), Siena, Italy, Sep. 2004.

Xuan et al. "Reversible data hiding using integer wavelet transform and compounding techniques," International, International workshop on digital watermarking (IWDW2004), Oct. 2004, Seoul, Korea.

Ni et al. "Reversible data hiding" Proceedings of IEEE International Symposium on Circuits and Systems, vol. 2 pp. 912-915, Bangkok, Thailand, May 2003.

Ni et al. "Reversible data hiding," IEEE Transactions on Circuits and Systems for Video Technology, vol. 16, No. 3, pp. 354-362, Mar. 2006.

Xuan et al. "Lossless data hiding using integer wavelet transform and threshold embedding technique", IEEE International Conference on Multimedia and Expo (ICME05), Amsterdam, Netherlands, Jul. 6-8, 2005.

Xuan et al. "Lossless data hiding using histogram shifting method based on integer wavelets," International Workshop on Digital Watermarking (IWDW06), Nov. 2006, Jeju Island, Korea.

Xuan et al. "Optimum histogram pair based on image lossless data embedding," International Workshop on Digital Watermarking (IWDW07), Dec. 3-5, 2007, Guangzhou, China.

Xuan et al. "Reversible data hiding for JPEG images based on histogram pairs," International Conference on Image Analysis and Recognition (ICIAR07), Aug. 22-24, 2007, Montreal, Canada.

Yousefi et al. "Reversible date hiding using multi level integer wavelet decomposition and intelligent coefficient selection," IEEE International Conference on Multimedia Expo (ICME07), Beijing, China, Jul. 2007.

Weng, et al. "Reversible data hiding using the companding technique and improved DE method," Circuits, Systems, and Signal Processing (2008), 27:229-245.

Coltuc et al. "Very fast watermarking by reversible contrast mapping," IEEE Signal Processing Lettrs, vol. 14, No. 4, pp. 255-238, Apr. 2007.

* cited by examiner

| Payload (bpp) | Proposed method 8 neighbor pixel PSNR | T | S | $T_F$ | GL | GR | Book Keeping (bit) | Method in [4] PSNR | Method in [6] PSNR |
|---|---|---|---|---|---|---|---|---|---|
| 0.01 | 67.1192 | 4 | -4 | 18 | 0 | 0 | 0 | 66.8176 | 61.7221 |
| 0.02 | 63.7495 | -4 | 3 | 20 | 0 | 0 | 0 | 60.8120 | 58.5490 |
| 0.03 | 61.7947 | 3 | -3 | 21 | 0 | 0 | 0 | 57.9479 | 56.7872 |
| 0.04 | 60.2693 | -3 | 2 | 22 | 0 | 0 | 0 | 56.2457 | 55.3473 |
| 0.05 | 59.1622 | -3 | 2 | 27 | 0 | 0 | 0 | 54.9888 | 54.3956 |
| 0.1 | 55.3834 | -2 | 1 | 35 | 0 | 0 | 0 | 51.6197 | 51.6214 |
| 0.2 | 50.8388 | -1 | 0 | 105 | 0 | 0 | 0 | 46.7503 | 48.1862 |
| 0.3 | 47.1297 | -2 | 0 | 75 | 0 | 0 | 0 | 43.4413 | 45.9628 |
| 0.4 | 45.1135 | -2 | 0 | 300 | 0 | 0 | 0 | 42.1513 | 43.8657 |
| 0.5 | 43.0544 | -3 | 0 | 300 | 0 | 0 | 0 | 40.1369 | 42.0718 |
| 0.6 | 41.4742 | -4 | 0 | 300 | 0 | 0 | 0 | 38.5915 | 39.6280 |
| 0.7 | 39.8815 | -5 | 0 | 550 | 0 | 0 | 0 | 37.3204 | 38.0374 |

| Payload (bpp) | Proposed method 8 neighbor pixel PSNR | T | S | $T_F$ | GL | GR | Book Keeping (bit) | Method in [4] PSNR | Method in [6] PSNR |
|---|---|---|---|---|---|---|---|---|---|
| 0.01 | 68.2423 | -4 | 3 | 14 | 0 | 0 | 0 | 60.7377 | 61.5233 |
| 0.02 | 64.7880 | -4 | 3 | 24 | 0 | 0 | 0 | 57.8281 | 58.6413 |
| 0.03 | 62.6812 | 3 | -3 | 24 | 0 | 0 | 0 | 56.3048 | 56.9678 |
| 0.04 | 61.1501 | 3 | -3 | 31 | 0 | 0 | 0 | 54.9172 | 55.6044 |
| 0.05 | 60.0207 | -3 | 2 | 31 | 0 | 0 | 0 | 53.7626 | 54.5774 |
| 0.1 | 55.2060 | 1 | -1 | 35 | 0 | 0 | 0 | 49.3781 | 51.5238 |
| 0.2 | 49.8432 | -2 | 0 | 50 | 0 | 0 | 0 | 45.7463 | 47.7912 |
| 0.3 | 46.9500 | -2 | -1 | 200 | 0 | 0 | 0 | 42.4234 | 45.3906 |
| 0.4 | 44.5882 | -3 | 0 | 220 | 0 | 0 | 0 | 39.9762 | 42.5969 |
| 0.5 | 41.7823 | -4 | 0 | 700 | 0 | 0 | 0 | 38.0391 | 40.2397 |
| 0.6 | 39.3312 | -5 (-3) | 0 (2) | 700 (700) | 0 0 | 0 0 | 0 0 | 36.4297 | 36.7379 |
| 0.7 | 37.1191 | -5 (-3) | 0 (0) | 700 (700) | 0 0 | 0 0 | 0 0 | 34.7010 | 34.8312 |

\* Payload achieved via two loop embedding for 0.6 bpp and 0.7 bpp, and the second loop's T, S and $T_F$ are inside the parentheses.

| Payload (bpp) | Proposed method 8 neighbor pixel PSNR | T | S | $T_F$ | GL | GR | Book Keeping (bit) | Method in [4] PSNR | Method in [6] PSNR |
|---|---|---|---|---|---|---|---|---|---|
| 0.01 | 63.1228 | 3 | -3 | 61 | 0 | 0 | 0 | 55.0483 | 57.0467 |
| 0.02 | 59.5275 | 3 | -3 | 110 | 0 | 0 | 0 | 53.0026 | 53.9668 |
| 0.03 | 57.2949 | 3 | -3 | 180 | 0 | 0 | 0 | 51.5381 | 51.8919 |
| 0.04 | 55.4586 | 3 | -3 | 310 | 0 | 0 | 0 | 47.4988 | 50.1198 |
| 0.05 | 53.7334 | -3 | 2 | 510 | 0 | 0 | 0 | 46.8632 | 48.6050 |
| 0.1 | 47.6303 | -3 | 0 | 500 | 0 | 0 | 0 | 44.4061 | 45.8538 |
| 0.2 | 41.5782 | -3 | 0 | 700 | 0 | 0 | 0 | 38.3883 | 40.5566 |
| 0.3 | 37.7973 | -6 | 0 | 1100 | 6 | 0 | 768 | 34.9115 | 37.0445 |
| 0.4 | 34.7290 | -8 | 0 | 2000 | 8 | 0 | 1240 | 32.4800 | 33.9959 |
| 0.5 | 31.9408 | -11 | 0 | 3200 | 11 | 0 | 2033 | 30.6436 | 30.6193 |
| 0.6 | 29.2677 | -14 | 0 | 6500 | 14 | 0 | 3028 | 28.8299 | - |

| Payload (bpp) | Proposed method 8 neighbor pixel PSNR | T | S | $T_F$ | GL | GR | Book Keeping (bit) | Method in [4] PSNR | Method in [16] PSNR |
|---|---|---|---|---|---|---|---|---|---|
| 0.01 | 66.5029 | 1 | 1 | 8 | 0 | 1 | 237 | 61.3280 | 57.4914 |
| 0.02 | 63.6338 | 1 | 1 | 11 | 0 | 1 | 317 | 58.7911 | 56.1101 |
| 0.03 | 61.8922 | 1 | 1 | 15 | 0 | 1 | 412 | 57.1982 | 54.9854 |
| 0.04 | 60.6209 | 1 | 1 | 19 | 0 | 1 | 554 | 56.1159 | 54.1393 |
| 0.05 | 59.6453 | 1 | 1 | 23 | 0 | 1 | 641 | 55.1321 | 53.4358 |
| 0.1 | 54.6896 | 0 | 0 | 160 | 0 | 1 | 2185 | 51.5525 | 48.0613 |
| 0.2 | 51.3206 | -1 | 0 | 150 | 1 | 1 | 8454 | 45.8943 | 45.9283 |
| 0.3 | 47.2595 | -2 | 0 | 160 | 2 | 2 | 22478 | 42.3550 | 42.9015 |
| 0.4 | 44.5160 | -3 | 0 | 200 | 3 | 3 | 37220 | 39.9119 | 39.4289 |
| 0.5 | 41.0229 | -4 | 0 | 900 | 4 | 4 | 70230 | 37.9534 | 36.1644 |

REVERSIBLE DATA HIDING

BACKGROUND

Digital data hiding can be used to hide information into multimedia for communication or other use. Most multimedia data hiding techniques distort the original media by inserting hidden data therein, creating marked media. In some cases, the effects on the original cover media caused by the hidden data may not be fully reversible upon extraction of that data. Although the distortion is often small and imperceptible to human visual systems (HVS), the irreversibility is unacceptable for certain sensitive applications, such as legal and medical imaging.

Reversible, or lossless, media data hiding, where the original media is recovered fully after extraction of the hidden data, has wide applications in, among others, law enforcement, medical and military imaging systems, content authentication, covert communications, e-banking, and e-government. As may be appreciated, reversible data hiding is useful in sensitive applications wherein it is desired to prevent permanent loss of signal fidelity. Reversibility means to embed data into digital media, such as images, and restore the original cover media from marked media losslessly. Generally, for data hiding to be reversible, the hidden data is able to be extracted correctly and the marked media is able to be inverted back to the original cover media exactly after the hidden data is extracted.

Two issues commonly arise in attempting to reverse data hiding: data collision and underflow/overflow. Data collision refers to the situation where changed data (including, for example, values of image pixel, transform coefficient, and prediction-error) due to data hiding is confused with the unchanged data during data extraction and original image recovery. Underflow and/or overflow refers to the situation where image grayscale values after data hiding exceed the allowed range from the lower and upper bounds, respectively. For example, the allowed range for pixel values of an 8-bit grayscale image is from 0 to 255. After data embedding, a gray value lower than 0 is referred to as underflow; a gray value higher than 255 is referred to as overflow. For the sake of simplicity, underflow and/or overflow are referred to herein collectively as overflow.

To solve the issues of data collision and overflow/underflow, the bookkeeping data (or histogram modification data) may be required. The manner of handling these issues affects the performance of reversible data hiding in terms of pure payload versus visual quality of marked image (frequently evaluated by peak signal-to-noise ratio (PSNR)).

Early attempts at reversible data hiding, used modulo-256 addition to solve both issues to achieve reversibility. Modulo-256, however, causes salt-and-pepper noise, which is not ideal for most of applications. Lossless compression of bit-planes were then used with limited embedding rate. A regular-singular (RS) method was developed and has achieved relatively high embedding rate. Y. Q. Shi, "Reversible data hiding," International Workshop on Digital Watermarking, Seoul, Korea, October 2004.

J. Tian, "Reversible data embedding using a difference expansion," IEEE Transaction on Circuits and Systems for Video Technology, 2003, 13 (8):890-896. This difference expansion method significantly advanced the performance of reversible data hiding in terms of embedding rate versus visual quality of marked image (PSNR). This method uses a location map to address both collision and overflow issues. Following this method, several reversible data hiding schemes using location maps to achieve reversibility with improved performance.

Different methods have been developed using histogram modification. Specifically, one method was developed for addressing overflow using histogram shrinking towards the center. G. Xuan, J Chen, J Zhu, Y. Q. Shi, Z. Ni, and W. Su, "Distortionless data hiding based on integer wavelet transformation," IEEE Electronics Letters, vol. 38, No. 25, pp. 1646-1648, December 2002. Another method was developed for addressing collision by histogram shifting. This method involves selecting or creating a zero point immediately nearby a peak point in the histogram of a given cover image to embed data reversibly by shifting the whole portion of histogram towards right or left by one unit to avoid collision. Z. Ni, Y Q. Shi, N. Ansari, and W. Su, "Reversible data hiding," Proceedings of IEEE International Symposium on Circuits and Systems, vol 2, pp. 912-915, Bangkok, Thailand, May 2003.

A further advance combined the above two methods, i.e., histogram shrinking to avoid overflow and histogram shifting to avoid collision. G. Xuan, Y. Q. Shi, C. Yang, Y Zheng, D. Zou, P. Chai, "Lossless data hiding using integer wavelet transform and threshold embedding technique," IEEE International Conference on Multimedia and Expo (ICME05), Amsterdam, Netherlands, Jul. 6-8, 2005. Various improved schemes have followed this strategy. Instead of always applying histogram shrinking for various images and providing equal amount of histogram shrinkage at both right and left ends, histogram shrinking becomes adaptive. That is, histogram shrinking is not done unless overflow/underflow is detected. As a result, histogram shrinking does not happen for many images as the embedding rate is not very high, and the amount of shrinkage at the two ends, if happening, may not be the same. Instead of choosing a threshold T, then shifting all the portion of histogram h(x) as $|x|>T$, a new concept of histogram pair is established. Histogram pair is defined as two horizontally immediately neighboring points in histogram such that $[h(x) \neq 0, h(x+1)=0]$ for $x>0$ or $[h(x-1)=0, h(x) \neq 0]$ for $x<0$. Once a histogram pair is found or created, we can embed data at x. In this way, histogram shifting in data embedding is more flexible. In addition, the embedding points will be within $|S| \leq |x| \leq T$ (instead of $|x| \leq T$), where S is called as a stop point, and $-T \leq S \leq T$. It has been demonstrated that the optimal value of T with respect to the best performance in terms of pure embedding rate versus PSNR of marked image can be searched computationally. G. Xuan, Y Q. Shi, P. Chai, X Cui, Z. Ni, X Tong, Optimum histogram pair based image lossless data embedding, International Workshop on Digital Watermarking (IWDW07), 3-5 Dec. 2007, Guangzhou, China; and G. Xuan, Y Q. Shi, Z. Ni, P. Chai, X Cui, and X Tong, Reversible data hiding for JPEG images based on histogram pairs, International Conference on Image Analysis and Recognition (ICIAR07), Aug. 22-24, 2007, Montreal, Canada. Furthermore, the histogram shrinking can now be executed as an inverse process of histogram pair based data embedding process. That is, after the data embedding histogram become more flat, while after histogram shrinking, the histogram becomes steeper.

SUMMARY

Methods for reversible data hiding are disclosed herein. These methods may be applied to images for reversible data hiding.

In one embodiment, a method for reversible data hiding comprises identifying carrier data having a plurality of components and establishing prediction-errors for each of the components of the carrier data. A first threshold and a second threshold are established. The prediction-errors of the components are evaluated against the first threshold to identify components for possible hiding. The components identified for possible hiding are evaluated against the second threshold to identify components for hiding. To-be embedded data is embedded into the carrier data identified for hiding to create marked data. The marked data is evaluated for overflow or underflow. If overflow or underflow is detected, histogram modification is performed. Marked data is then established.

In variations of this embodiment, the carrier data may be an image and the components of the carrier data may be pixels of the image, the first threshold may be an embedding threshold applied to magnitude of prediction-errors, and/or the second threshold may be a fluctuation threshold applied to magnitude of neighborhood fluctuation. Evaluating prediction-errors against the embedding threshold may select only those prediction-errors whose magnitude does not exceed the embedding threshold. Evaluating prediction-errors against the fluctuation threshold may select only those prediction-errors the whose associated neighborhood-fluctuation value does not exceed the fluctuation threshold. Modifying the histogram may comprise shrinking the histogram.

In accordance with another embodiment, a method for reversible data hiding for images comprises identifying a carrier image having pixels and developing prediction-errors for the pixels. A fluctuation threshold and an embedding threshold are determined. The prediction-errors of the pixels are evaluated against the embedding threshold. The associated neighborhood fluctuations of the pixels are evaluated against the fluctuation threshold. To-be-embedded-data is embedded based on these evaluations against the two thresholds. A marked image is created when the to-be embedded data is embedded into the carrier image.

In variations of this method, the method may further involve evaluating whether the embedding threshold is under maximizing PSNR for a given data embedding rate and, if the selected embedding threshold is not under maximizing PSNR, setting a new embedding threshold and/or evaluating whether the fluctuation threshold is under maximizing PSNR, if the fluctuation threshold is not under maximizing PSNR, setting a new fluctuation threshold. The method may further involve evaluating the embedded data for underflow or overflow and histogram modification if underflow or overflow is detected. Histogram modification may be done by histogram shrinking, such as by optimum histogram pair methodology. The embedding threshold may be applied to magnitude of prediction-errors and evaluating prediction-errors against the embedding threshold and select only those prediction-errors whose magnitude does not exceed the embedding threshold. The fluctuation threshold may be applied to magnitude of neighborhood fluctuation and selects only those prediction-errors whose associated neighborhood does not have fluctuation exceeding the fluctuation threshold.

In accordance with yet another embodiment, a computer accessible medium having stored thereon computer executable instructions for processing an image when the executable instructions are executed by a processing unit is provided. The processing unit performs a procedure comprising, configuring the processing unit to perform a procedure comprising identifying a carrier image having pixels and developing prediction-errors for the pixels. The processing unit determines a fluctuation threshold and an embedding threshold, evaluates prediction-errors of the pixels against the embedding threshold, and evaluates the neighborhood fluctuation of the prediction errors of the pixels against the fluctuation threshold to identify the prediction-errors for data embedding. A marked image is established by embedding to-be embedded data into the carrier image. In some embodiments, the processing unit may convert the established image back to the original image.

The foregoing is a summary and thus contains, by necessity, simplifications, generalization, and omissions of detail; consequently, those skilled in the art will appreciate that the summary is illustrative only and is not intended to be in any way limiting. Other aspects, features, and advantages of the devices and/or processes and/or other subject matter described herein will become apparent in the teachings set forth herein. The summary is provided to introduce a selection of concepts in a simplified form that are further described below in the Detailed Description. This summary is not intended to identify key features or essential features of the claimed subject matter, nor is it intended to be used as an aid in determining the scope of the claimed subject matter.

BRIEF DESCRIPTION OF THE FIGURES

The foregoing and other features of the present disclosure will become more fully apparent from the following description and appended claims, taken in conjunction with the accompanying drawings. Understanding that these drawings depict only several embodiments in accordance with the disclosure and are, therefore, not to be considered limiting of its scope, the disclosure will be described with additional specificity and detail through use of the accompanying drawings, in which:

FIG. 17a is a histogram of the image of FIG. 16a.
FIG. 19a is a graph of the performance comparison on the image in terms of pure data embedding rate versus PSNR of marked image among several recently reported reversible data hiding schemes for the image of FIG. 16a.
FIG. 19b is a table showing experimental results and parameters for the image of FIG. 16a.

DETAILED DESCRIPTION

Figure 1A:
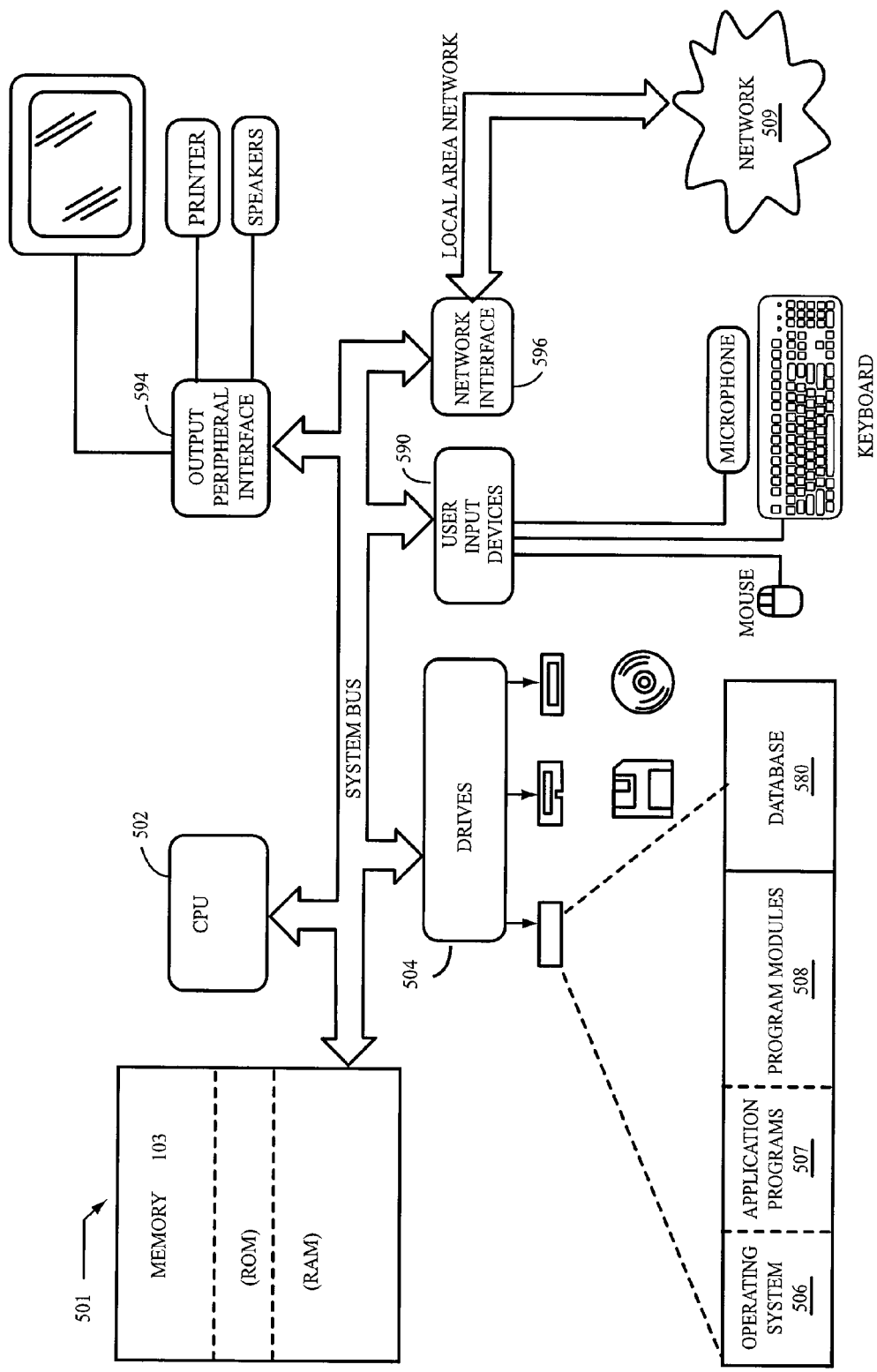
FIG. 1a is a diagram of a system suitable for use with a method for reversible image data hiding in accordance with one embodiment.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented herein. It will be readily understood that the aspects of the present disclosure, as generally described herein, and illustrated in the Figures, can be arranged, substituted, combined, separated, and designed in a wide variety of different configurations, all of which are explicitly and implicitly contemplated herein.

A method for reversible data hiding is provided herein. In various embodiments, the method comprises a double threshold scheme of neighborhood-fluctuation guided reversible data hiding into prediction errors. While specific reference is made to reversible image data hiding, it is to be appreciated that the methods taught herein may be applied with use to reversible data hiding of other media. In some embodiments, the method may be used for grey scale images. Reference is made herein to various types of data including carrier data, to-be-embedded data, and marked data. Carrier data is intended to refer to the original data that is being considered for hiding. To-be-embedded data is intended to refer to the data that may be embedded into the original data to hide the data. Marked data is intended to refer to the data that results when the to-be-embedded data is embedded in the carrier data. Marked data thus comprises a linkage of carrier data and to-be-embedded data. The phrase "data embedding" is used herein and is intended to refer to the process of embedding to-be-embedded data into the carrier data. The phrase "data hiding" is used herein and is intended to refer to the overall process of creating marked data, thereby hiding the to-be-embedded data into the carrier data.

As may be appreciated by one skilled in the art, a method for data hiding may be implemented in a computing environment. FIG. 1a thus generally illustrates a suitable computing environment in which such a method may be implemented. It is to be appreciated that the various method steps are generally described and may be considered as implementable on computer executable program modules containing instructions executed by a personal computer (PC). Program modules include routines, programs, objects, components, data structures, and other that perform particular tasks or implement particular data types. Those skilled in the art will appreciate that the method may be practiced with other computer-system configurations, including hand-held devices, multiprocessor systems, microprocessor-based programmable consumer electronics, network PCs, minicomputers, mainframe computers, and the like which have multimedia capabilities. The method further may be implemented in distributed computing environments where tasks are performed by remote processing devices linked through a communications network. In a distributed computing environment, program modules may be located in both local and remote memory storage devices.

FIG. 1a illustrates a computing system environment suitable for implementing various embodiments disclosed herein. The computing system may include a computer 501, including a processor 502, memory 503 and one or more drives 504. The drives 504 and their associated computer storage media, provide storage of computer readable instructions, data structures, program modules and other data for the computer 501. Drives 504 can include an operating system 506, application programs 507, program modules 508, and database 580. Computer 501 further includes user input devices 590 through which a user may enter commands and data. Input devices can include an electronic digitizer, a microphone, a keyboard and pointing device, commonly referred to as a mouse, trackball or touch pad. Other input devices may include a joystick, game pad, satellite dish, scanner, or the like.

These and other input devices can be connected to processor 502 through a user input interface that is coupled to a system bus, but may be connected by other interface and bus structures, such as a parallel port, game port or a universal serial bus (USB). Computers such as computer 501 may also include other peripheral output devices such as speakers, which may be connected through an output peripheral interface 594 or the like.

Computer 501 may operate in a networked environment using logical connections to one or more computers, such as a remote computer connected to network interface 596 The remote computer may be a personal computer, a server, a router, a network PC, a peer device or other common network node, and can include many or all of the elements described above relative to computer 501. Networking environments are commonplace in offices, enterprise-wide area networks (WAN), local area networks (LAN), intranets and the Internet. For example, in the subject matter of the present application, computer 501 may comprise the source machine from which data is being migrated, and the remote computer may comprise the destination machine or vice versa. Note however, that source and destination machines need not be connected by a network 509 or any other means, but instead, data may be migrated via any media capable of being written by the source platform and read by the destination platform or platforms. When used in a LAN or WLAN networking environment, computer 500 is connected to the LAN through a network interface 596 or an adapter. When used in a WAN networking environment, computer 501 typically includes a modem or other means for establishing communications over the WAN, such as the Internet or network 509. It will be appreciated that other means of establishing a communications link between the computers may be used.

Figure 1B:
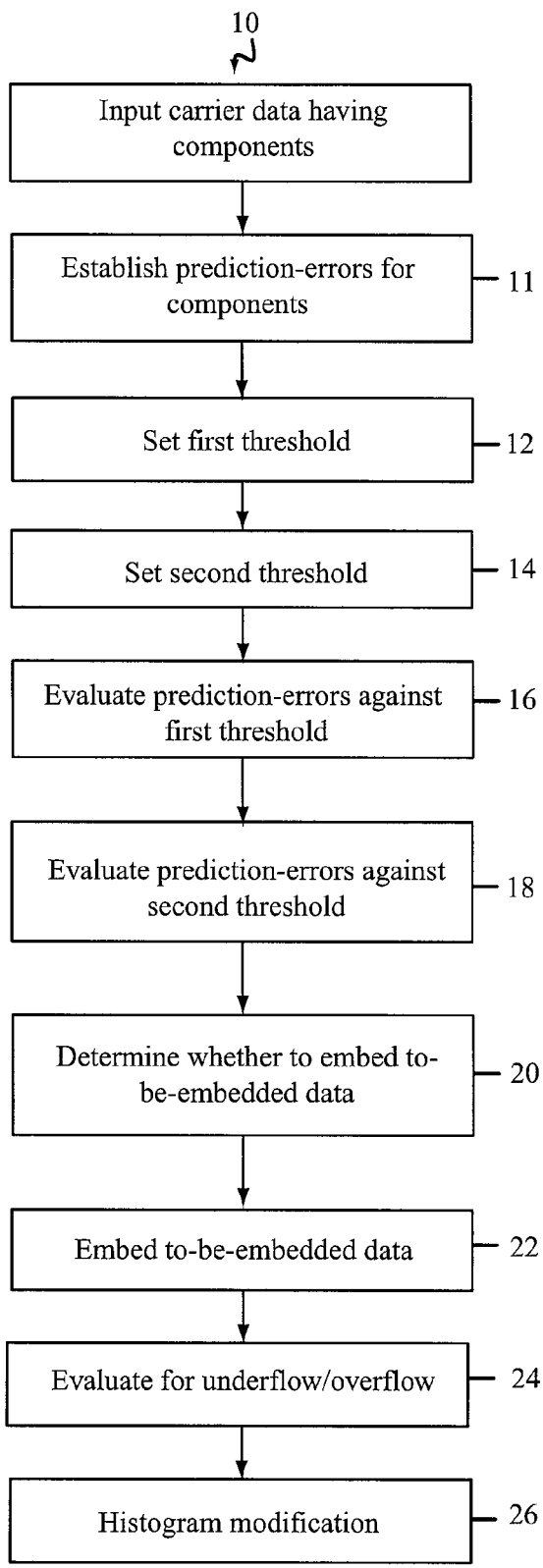
FIG. 1b is an example flow diagram of reversible image data hiding in accordance with one embodiment.

FIG. 1b illustrates a block diagram of a method for data hiding. The method 10 uses double thresholdings to selectively reversibly embed data into image prediction-errors to create marked data. As shown, the method comprises inputting (or otherwise identifying) carrier data [block 11]. The carrier data includes a plurality of components. For example, where the carrier data is an image, the components are pixels. The method next comprises establishing prediction-errors for the components of the carrier data [block 12]. A first threshold, an embedding threshold, is set [block 14], and a second threshold, a fluctuation threshold, is set [block 16]. The prediction-errors for each component of the carrier data are then evaluated against the embedding threshold [block 18] and the fluctuation threshold [block 20]. Based on this evaluation, it is determined whether data embedding is to be performed any given component [block 22]. Hiding data may then be embedded within the carrier data at that component, thereby creating marked data [block 24]. The marked data is evaluated for underflow or overflow [block 25]. Histogram modification of the marked data is performed if underflow or overflow is found [block 26].

The embedding threshold is applied to the magnitude of the prediction-errors. Evaluating the prediction-errors against the embedding threshold [block 18] and determining whether data embedding is to be performed on a component of the carrier data based on this evaluation [block 22] involves selecting only those prediction-errors whose magnitude does not exceed the embedding threshold, for possible data embedding, and thus reversible data hiding. This may be an initial selection and selected components of the carrier data may then be evaluated against the fluctuation threshold.

The fluctuation threshold is applied to the magnitude of neighborhood-fluctuation. Accordingly, neighboring values of the component of the carrier data are compared to the fluctuation threshold. Evaluating the prediction-errors against the fluctuation threshold [block 20] and determining whether data embedding is to be performed on the given data based on this evaluation [block 22] involves selecting only those prediction-errors whose associated neighborhood-fluctuation value is not larger than the fluctuation threshold, for possible data embedding, and thus reversible data hiding.

Accordingly, determining whether data embedding is to be applied to a component of the carrier data [block 22] comprises comparing the prediction-errors of the component and neighboring values against both the embedding threshold and the fluctuation threshold. Thus, only if both thresholds are satisfied, the prediction-error, hence, the component of that prediction-error, for example the pixel under examination, is used for data embedding to create marked data.

Histogram modification can then be applied to the marked data [block 26] on a dynamic basis. Whenever underflow and/or overflow are/is detected during the data embedding, the histogram modification process is conducted. Image histogram modification is dynamic and, in some situations, may not be applied at all while, in other situations, may be conducted multiple times. Accordingly, in some embodiments, to avoid underflow and/or overflow, image grayscale value histogram modification is conducted to shrink the image histogram towards the center. The information about image histogram modification is recorded as bookkeeping data and is embedded into image prediction-errors together with the pure payload.

In accordance with one embodiment, data embedding into prediction-errors is conducted using a histogram-pair scheme. Reference is made herein to histogram modification. Histogram shrinking is a subset of histogram modification and may, in some embodiments, be used with methods described herein. Generally, histogram shrinking is a reverse process of histogram-pair data embedding. Histogram shrinking causes the histogram to shrink while histogram-pair data embedding causes prediction-error histogram to expand.

Performance of pure data embedding rate versus marked image's visual quality can be evaluated by peak signal-to-noise ratio ("PSNR") and improved by adjusting one or both of the embedding threshold and the fluctuation threshold.

Figure 1C:
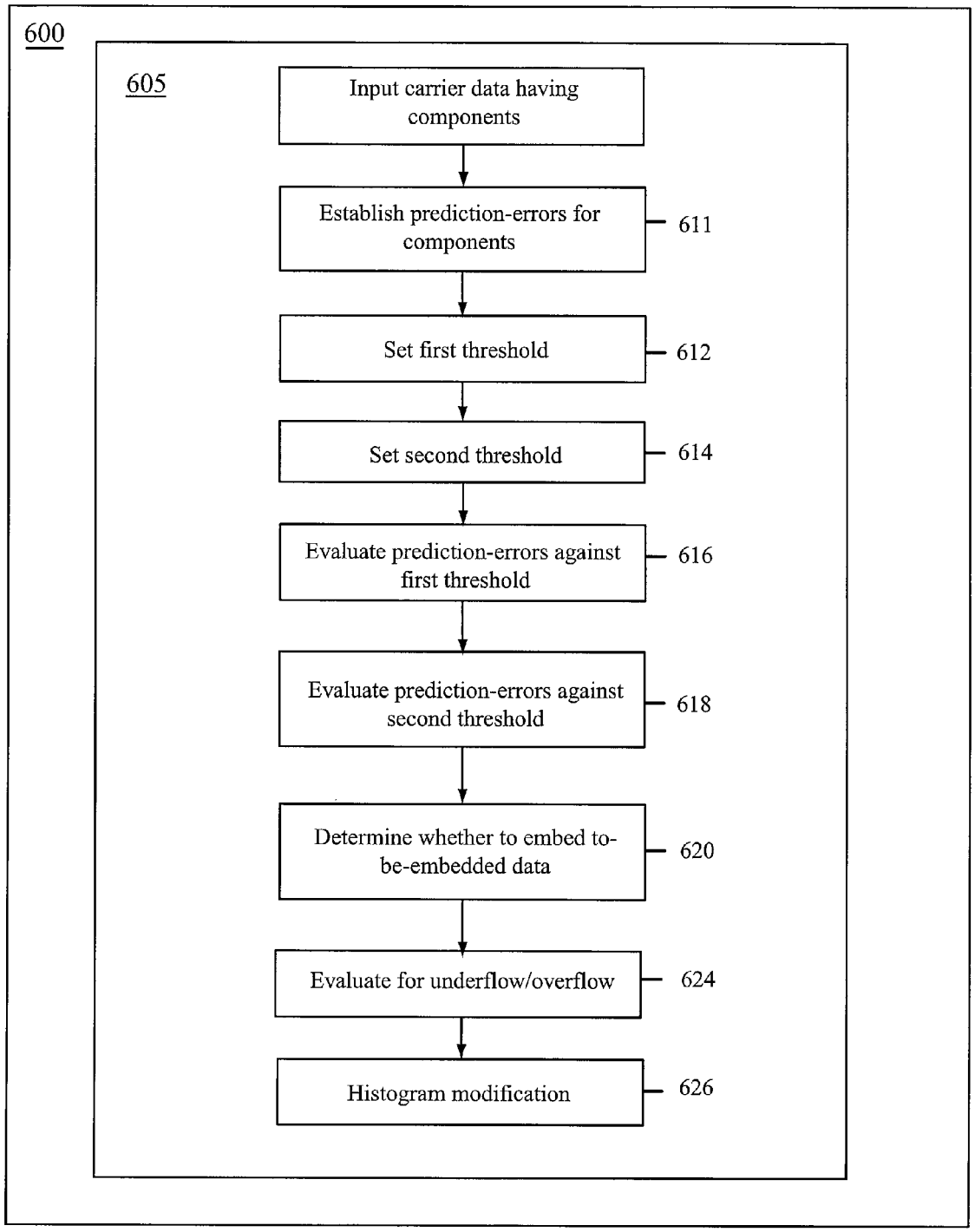
FIG. 1c is a schematic of a system for performing a method of reversible data hiding in accordance with one embodiment.

In one particular embodiment, as shown in the schematic of FIG. 1c, a computer system 600 may include a processor 605 configured for performing an embodiment of a method for reversible data hiding. In other embodiments, various steps or portions of various steps of the method may be performed outside of the processor 605. In various embodiments, the method may include inputting (or otherwise identifying) carrier data [block 611]. The carrier data includes a plurality of components. For example, where the carrier data is an image, the components are pixels. The method next comprises establishing prediction-errors for the components of the carrier data [block 612]. A first threshold, an embedding threshold, is set [block 614], and a second threshold, a fluctuation threshold, is set [block 616]. The prediction-errors for each component of the carrier data are then evaluated against the embedding threshold [block 618] and the fluctuation threshold [block 620]. Based on this evaluation, it is determined whether data embedding is to be performed any given component [block 622]. Hiding data may then be embedded within the carrier data at that component, thereby creating marked data [block 624]. The marked data is evaluated for underflow or overflow [block 625]. Histogram modification of the marked data is performed if underflow or overflow is found [block 626]

Prediction Errors

The double threshold scheme, involving an embedding threshold and a fluctuation threshold is, in some embodiments, based on an eight neighbor pixel prediction method and eight neighbor pixel fluctuation. These are then used in establishing prediction errors (as discussed with respect to block 12 of FIG. 1). An eight-neighbor scheme is merely intended to be illustrative and other schemes for establishing prediction errors, including other numbers of neighbors, may be used.

A method of determining prediction values is herein described. This method refers specifically to pixels and neighboring pixels but it is to be appreciated that it may be applied to any component and neighboring components of carrier data. The prediction value $\bar{x}$ is determined as follows:

Assume the current pixel value is x. the eight neighbor pixel values are x1, x2, x3, x4, x5, x6, x7, x8.

$$X = \begin{bmatrix} x1 & x4 & x7 \\ x2 & x5 & x8 \\ x3 & x6 & x9 \end{bmatrix} \quad \text{(Eq. 1)}$$

For the central value x in the square 3×3, 8 neighbor pixel values are used to obtain the prediction value $\bar{x}$, where 8 neighbor pixel values are x1, x2, x3, x4, x5, x6, x7, x8.

Eq. 2 is used to represent the prediction value $\bar{x}$:

$$\bar{x}=\text{floor}\{(1/6)\times(x2+x4+x6+x8)+(1/12)\times(x1+x3+x7+x9)\} \quad (Eq. 2)$$

The prediction value is the weighted average value of 8 neighbors as shown below:

$$K = \begin{bmatrix} 1/12 & 1/6 & 1/12 \\ 1/6 & 0 & 1/6 \\ 1/12 & 1/6 & 1/12 \end{bmatrix}, \bar{x} = \text{floor}(K \otimes x) \quad (Eq. 3)$$

During the data embedding process, the raster order can be used; the scan order is from left to right and from top to bottom. The data recovery is the reverse procedure and scans from right to left and from bottom to top.

In the embodiment described, 8 neighbor pixel values are used in prediction. Other methods for prediction to establish prediction errors may alternatively be used, as would be known to one skilled in the art. For example, JPEG-LS prediction may be used. L. Kamstra, H. J. A. M. Heijmans, "Reversible data embedding into images using wavelet techniques and sorting," IEEE Transactions on Image Processing, vol. 14, No. 12, pp. 2082-2090, December 2005.

The difference between the prediction value and the actual pixel value is called prediction error EP=x−$\bar{x}$. In the embodiment based on 8 neighbor pixel values, the prediction error represents the difference of the window central pixel value x and the weighted average of 8 neighbor pixel value (prediction value $\bar{x}$).

The neighbor fluctuation value is defined as the weighted average of 8 neighbor pixels within the 3×3 window and is shown in Eq. 4.

$$F = \frac{2}{3} \times [(x2-\bar{x})^2 + (x4-\bar{x})^2 + (x6-\bar{x})^2 + (x8-\bar{x})^2] + \frac{1}{3} \times [(x1-\bar{x})^2 + (x3-\bar{x})^2 + (x7-\bar{x})^2 + (x9-\bar{x})^2] \quad (Eq. 4)$$

The neighbor fluctuation value F may be used to decide if the prediction-error, hence the corresponding central pixel, is used to embed data. If the pixel is not selected, it will not be used for embedding data. This is described more fully below with respect to the fluctuation threshold.

Neighbor fluctuation is considered in this scheme since it affects reversible data embedding performance. The pixels whose associated fluctuation value is smaller than fluctuation threshold are selected to possibly embed data. While an 8 neighbor scenario is specifically discussed, it is to be appreciated that other types of neighborhood can also be used.

Double Thresholds

The methods of reversible data hiding described herein embed to-be-embedded data into components of carrier data based on prediction errors of those components. Whether to embed data, and thus employ reversible data hiding, is based on two thresholds: an embedding threshold T and a fluctuation threshold $T_F$. The embedding threshold T is applied to the magnitude of the prediction-errors, and is used to select only those prediction-errors, whose magnitude does not exceed the embedding threshold, for possible reversible data hiding. The fluctuation threshold $T_F$ is applied to the magnitude of neighborhood-fluctuation and is used to select only those prediction-errors, whose associated neighborhood-fluctuation value is not larger than the fluctuation threshold, for possible reversible data hiding. Generally, the fluctuation threshold and the embedding threshold are determined based on the amount of to-be-embedded-data and the cover image. Generally, the fluctuation threshold and the embedding threshold are determined based on the amount of to-be-embedded-data and the carrier image (also referred to as a "cover image").

Pure data embedding rate and visual quality of marked image are performance indexes in reversible data hiding. The overall performance of a reversible data hiding method scheme can be evaluated by the curve of pure data embedding rate versus the visual quality of marked image evaluated by PSNR. At the same pure data embedding rate, the higher the PSNR of the marked image, the better the scheme. At the same PSNR of marked image, the more the pure data embedding rate, the better the scheme. The curves of PSNR versus pure data embedding rate over a wide range of the embedding rate are often used to compare the performance of different reversible data hiding schemes.

The minimum embedding threshold T does not necessarily lead to best performance in terms of visual quality versus embedding rate. However, an optimal T does exist and can be computationally searched. Furthermore, in order to achieve best performance, the histogram modification should be only conducted when underflow/overflow is detected. Finally it is shown that the best data embedding region should be considered.

Figure 2:
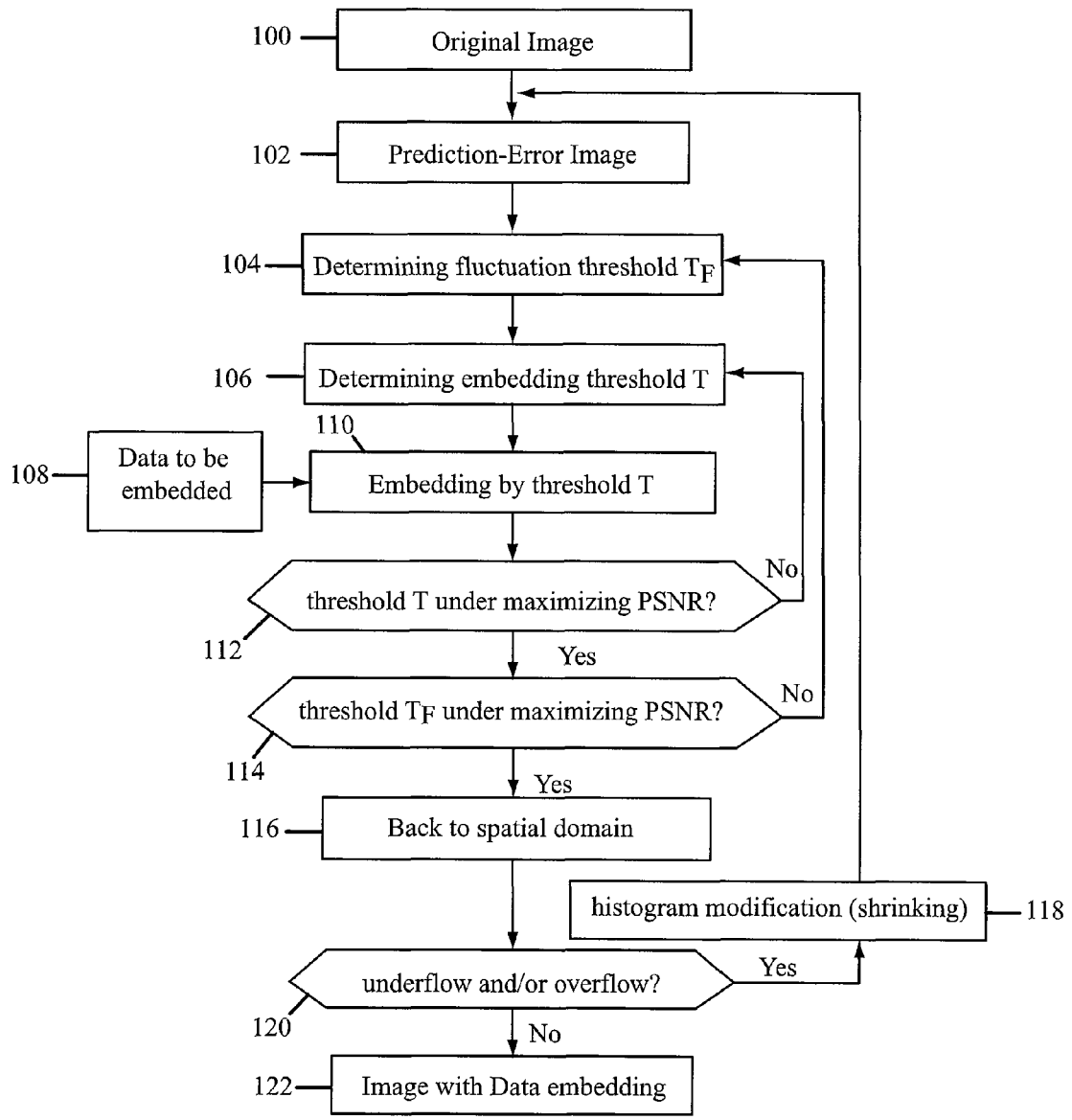
FIG. 2 is an example flow diagram of data embedding in accordance with one embodiment.

Two thresholds are used in the methods described herein: the embedding threshold T and the fluctuation threshold $T_F$. In setting the fluctuation threshold $T_F$, smaller is generally better since the smaller $T_F$ results in smaller distortion. However, if $T_F$ is chosen to be too small, the desired pure data embedding rate may not be able to implement. Hence, at a given pure embedding rate, some amount of $T_F$ has to be chosen. Once $T_F$ is chosen, the optimal embedding threshold T (and hence stop point S, or the t sequence, as discussed herein) can be searched. The optimality can be expressed as follows. It is appreciated that this is only one way of reaching two-dimensional (2-D) optimization and that other ways will be known by those skilled in the art. For example, FIG. 2 illustrates an alternative method of reaching 2-D optimization starting with $T_F$ adjustment followed by T adjustment with cycling through adjustment until 2-D optimality is achieved for the given pure data embedding rate or the process is otherwise ended.

For a required pure data embedding rate C, a neighbor fluctuation threshold $T_F$ and an embedding threshold T are set such that the resultant PSNR of the marked image is highest.

$$[T_F, T] = \underset{T_F,T}{\text{argmax}}(PSNR) \quad (Eq. 5)$$

This process may need to re-adjust fluctuation threshold $T_F$ followed by searching optimal embedding threshold once again. This searching for optimality is also reflected in the block diagram of data embedding, FIG. 1.

Other suitable methods for reversible data hiding may be used after double threshold analysis has determined that such hiding is called for. One suitable type of methodology is known as "Optimum Histogram Pair Methodology" is specifically described herein.

In order to avoid the data collision due to data embedding, the optimum histogram pair method may be applied to the histogram of the prediction-error. When shifting the prediction-error histogram, as in block 24 of FIG. 1, only a partial range of the predication-error histogram, whose prediction-error values are equal to or less than the embedding threshold T, is used to embed data in order to achieve highest PSNR at the given data embedding rate. Data embedding thus begins with T. If the to-be embedded data sequence has not been embedded fully, the remaining data sequence will be embedded into −T. In general, the sequence (called t sequence) is T, −T, T−1, −(T−1), . . . , S. S is called the stop point. If the data embedding begins with −T, as T>0, then the t sequence is: −T, T−1, −(T−1), . . . S. The stop point S is not necessarily equal to 0, it can be positive or negative; S=0 does not necessarily lead to the highest PSNR for the given pure payload. The range of prediction errors used for reversible data hiding satisfies $|S| \leq EP \leq T$ and $|S| \geq 0$.

The fluctuation value F, which reflects the fluctuation of the neighbor pixels, may be used to improve the data embedding performance. The fluctuation threshold $T_F$ is used as a factor to decide which prediction error, hence the corresponding pixel, is selected for data embedding. For each specific pixel under consideration, the fluctuation value remains unchanged before and after data embedding. This feature facilitates the reversibility of the image data hiding.

Accordingly, as an example of using a method as described herein, the prediction error is restricted to be positive. All of the image pixels are scanned in a predetermined sequence. For a given pixel, whose prediction error $E_P$ is equal to or less than the embedding threshold T (first threshold), and where the fluctuation value F associated with this pixel is equal to or less than the fluctuation threshold $T_F$ (second threshold), data embedding is conducted. When the prediction error value $E_P$ is greater than embedding threshold T, or when and the fluctuation value F is larger than the fluctuation threshold $T_F$, no data embedding is done for the given pixel, and the program moves to the next pixel.

Data Embedding

As previously noted, any method for reverse data hiding may be used with the methods described herein. Specific examples are given below and are not intended to be limiting.

Figure 3:
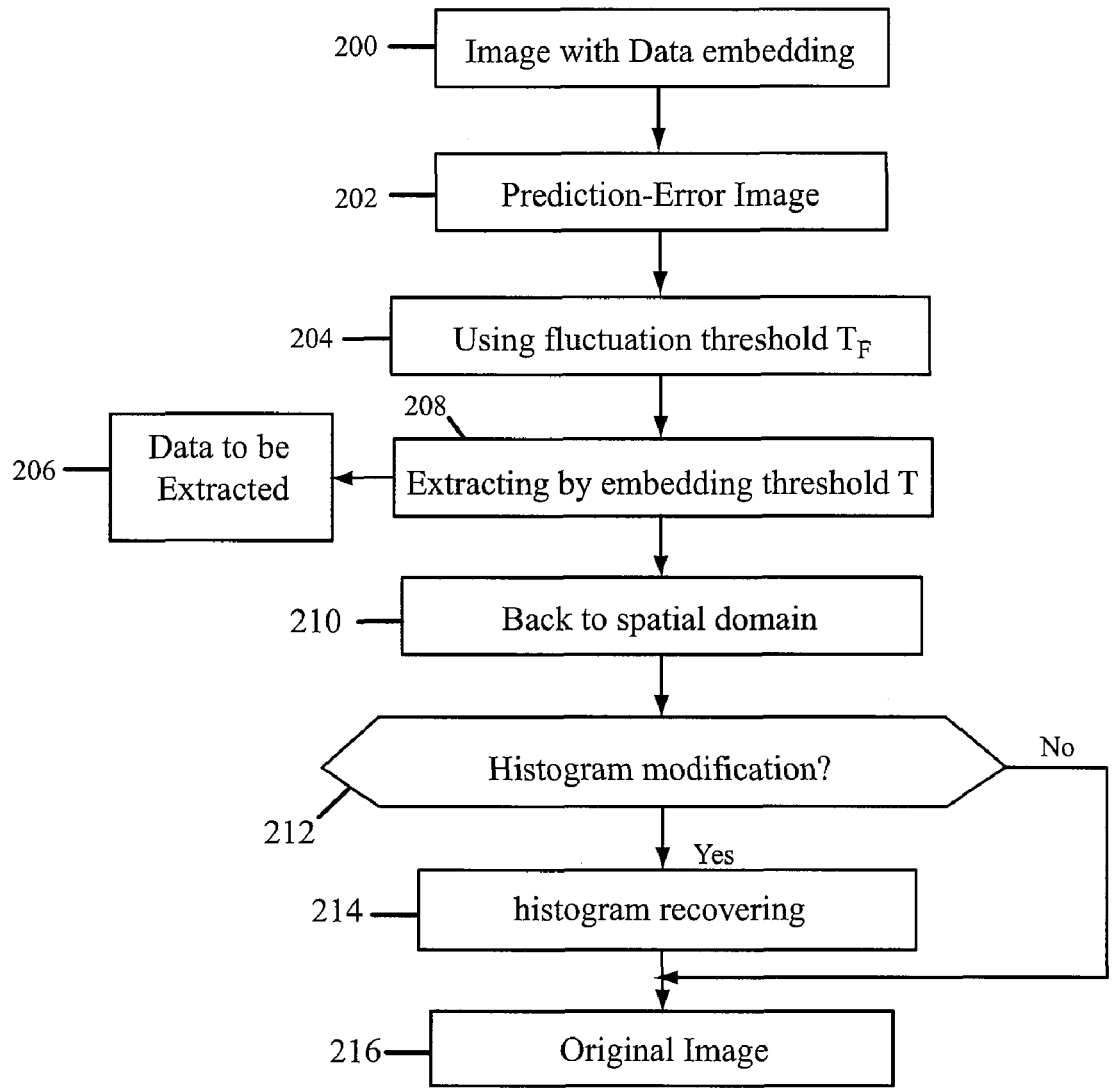
FIG. 3 is an example flow diagram of data extraction in accordance with one embodiment.

FIGS. 2 and 3 illustrate embodiments of data embedding and data extraction, respectively.

As shown in FIG. 2, to embed data in an image for reversible image data hiding, an original image is identified [block 100]. Based on this original image, a prediction-error image is created [block 102]. A fluctuation threshold $T_F$ and an embedding threshold T are determined [blocks 104 and 106]. Data to be embedded is identified [block 108] and is embedded on the basis of the embedding threshold T [block 110]. A query is made as to whether the embedding threshold T is under a maximizing PSNR [block 112]. If no, a new embedding threshold T is determined [return to block 106]. A query is made as to whether the fluctuation threshold $T_F$ is under a maximizing PSNR [block 114]. If no, a new fluctuation threshold $T_F$ is determined [return to block 104]. If yes to both block 112 and block 114, the method returns to the spatial domain [block 116]. A determination is made as to whether underflow or overflow is present [block 120]. If yes, histogram modification is performed [118] and the method is returned to block 102. If no, the image is returned with data embedding [block 122].

As shown in FIG. 3, to extract data and return to an original image, the image with data embedding is identified [block 200]. A prediction-error image is developed [block 202] using fluctuation threshold $T_F$ [block 204]. Data to be extracted is identified [block 206] and extracted by the embedding threshold T [block 208]. The method returns to the spatial domain [block 210]. A determination is made as to whether the histogram was modified [block 212]. If yes, histogram recovering is performed [block 214] and the original image is restored [block 216]. If no, the original image is restored [block 216] without histogram recovering.

Part 1. Fluctuation Value F is Used to Choose a Pixel for Possible Data Embedding If $F \leq T_F$, the pixel under examination is chosen for data embedding. If this is not satisfied, the pixel under examination is skipped. Fluctuation threshold $T_F$ is used to select pixel for possible data embedding. If this is not satisfied, the pixel is skipped. Assuming that the pixel is chosen for data embedding, the method moves to Part 2.

Part 2. Histogram Pair Data Embedding

In some embodiments, data embedding uses the optimum histogram pair method. The optimum histogram pair embedding algorithm is described below:

Embedding Threshold

Choose T, P←T.

Step 1: Scan the Image from Left to Right, Top to Bottom if $P \geq 0$, $$E_P = \begin{cases} E_P + b_i & \text{if } E_P = P \\ E_P - 1 & \text{if } E_P < P \\ E_P & \text{others} \end{cases} \quad (Eq.\ 6)$$

if $P < 0$ $$E_P = \begin{cases} E_P - b_i & \text{if } E_P = P \\ E_P - 1 & \text{if } E_P < P \\ E_P & \text{others} \end{cases} \quad (Eq.\ 7)$$

Step 2: Examine if all of the to-be Embedded Bits have been Embedded

If data embedding is not finished, then $$P = \begin{cases} -P & \text{if } P \geq 0 \\ -P - 1 & \text{if } P < 0 \end{cases} \quad (Eq.\ 8)$$

else S←P finish the data embedding.

In the above algorithm description, $b_i$ represents the to be embedded binary data and $b_i \in \{0, 1\}$. Notation T represents the starting point of data embedding and S represents the ending point of data embedding.

Embedding Threshold plus Fluctuation Threshold

As previously described, the fluctuation threshold $T_F$ is used to evaluate pixels for data embedding. This part of algorithm is described below.

Choose T and $T_F$, P←T

Step 1: Scan the Image from Left to Right and from Top to Bottom.

Compute F and EP of current pixel if $F > T_F$, skip current pixel, scan the next pixel else current pixel is chosen for possible data embedding.

if $P \geq 0$ (Eq. 9)

$$E_P p_e = \begin{cases} p_e + b_i & \text{if } p_e = P \\ p_e + 1 & \text{if } p_e > P \\ p_e & \text{others} \end{cases}$$

if $P < 0$

-continued $$E_P p_e = \begin{cases} p_e - b_i & \text{if } p_e = P \\ p_e - 1 & \text{if } p_e < P \\ p_e & \text{others} \end{cases} \quad \text{(Eq. 10)}$$

Step 2: Examine if all of the to-be Embedded Bits have been Embedded

If data embedding is not finished, then $$P = \begin{cases} -P & \text{if } P \geq 0 \\ -P - 1 & \text{if } P < 0 \end{cases} \quad \text{(Eq. 11)}$$

else S←P stop data embedding.

Data Extraction

Data extraction is the reverse process of data embedding.

Sample Data Embedding and Extraction

A sample scenario is presented below to illustrate data embedding and extraction. As described, the 8 neighbor scenario is simplified by 4 neighbor in prediction. Assume the pixel value of a part of a given image is shown as follows.

| 154 | 158 | 160 | 158 | 160 | 162 | 162 | 162 | 167 | 168 |
|---|---|---|---|---|---|---|---|---|---|
| 158 | 158 | 159 | 160 | 158 | 163 | 162 | 162 | 166 | 169 |
| 153 | 158 | 157 | 158 | 161 | 162 | 162 | 163 | 164 | 157 |

A 3×3 mask is shown below.

$$X = \begin{bmatrix} x1 & x4 & x7 \\ x2 & x5 & x8 \\ x3 & x6 & x9 \end{bmatrix}$$

The image pixel coincident with the center of the 3×3 mask is predicted by using its 4 neighbors as follows. The prediction, denoted by $\bar{x}$, is expressed as $\bar{x}=\text{floor}\{(x2+x4+x6+x8)/4\}$. The prediction error $EP=x-\bar{x}$. The neighbor fluctuation value $F=(x2-\bar{x})^2+(x4-\bar{x})^2+(x6-\bar{x})^2+(x8-\bar{x})^2$, and the fluctuation threshold $T_F$ is used.

(1) Date Embedding

Scan the image from left to right and from top to bottom. If the pixel fluctuation value F is less than the threshold $T_F$, then this pixel is selected to embed data according to optimum histogram pair method. Otherwise, the window slides to the next pixel.

Assume the embedding threshold, also referred to as embedding position T=0, fluctuation threshold $T_F=4$, and the to be embedded data is two bits: {1,0}.

Figure 4:
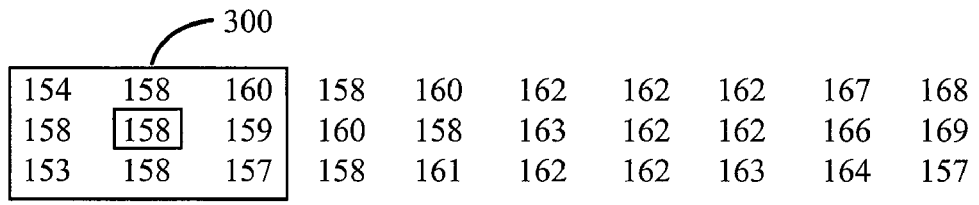
FIG. 4 is a diagram of a 3×3 window positioned during data embedding in accordance with one embodiment.

FIG. 4 illustrates the initial position of the 3×3 image window 300. As shown, the image window is positioned on the left. The window center is the first pixel, 158, under examination for possible data embedding. The prediction of the window-center pixel is $\bar{x}=158$, hence $E_P=0$. The fluctuation value F=1, which is smaller than fluctuation threshold $T_F$, i.e., $F<T_F$, this pixel is thus selected. According to the histogram pair method, bit 1 is embedded, hence $E_P$ changes to 1, i.e., $E_P \to 1$. This means the modified central pixel value is now 159, i.e., 158→159.

Figure 5:
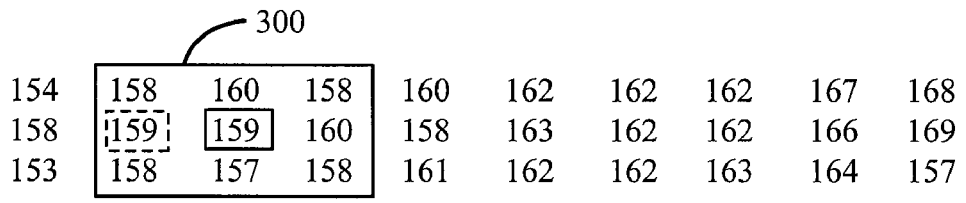
FIG. 5 is a diagram of a 3×3 window positioned during data embedding in accordance with one embodiment.
Figure 6:
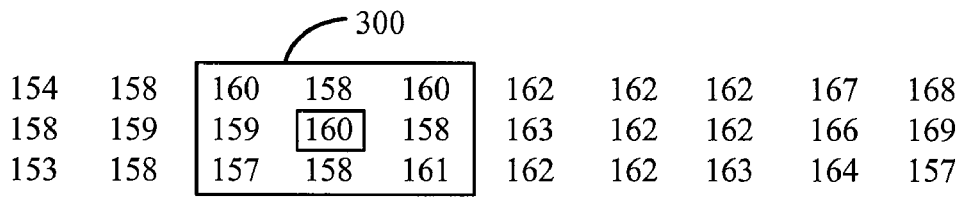
FIG. 6 is a diagram of a 3×3 window positioned during data embedding in accordance with one embodiment.

The window 300 is slid towards center to the next pixel 159, as shown in FIG. 5. Then, the predicted central value is 159 and the prediction error is $E_P=0$, and the fluctuation value $F=6>T_F$. Hence this pixel is not selected and no data is embedded. The window 300 skips this pixel and moves to the next pixel, shown in FIG. 6. The window center is now at the third pixel 160. The prediction error $E_P=1$, and the fluctuation value $F=1<T_F$, this pixel is selected for data embedding. According to the histogram pair method, $E_P \to 2$, i.e., the window center changes: 160→161.

Figure 7:
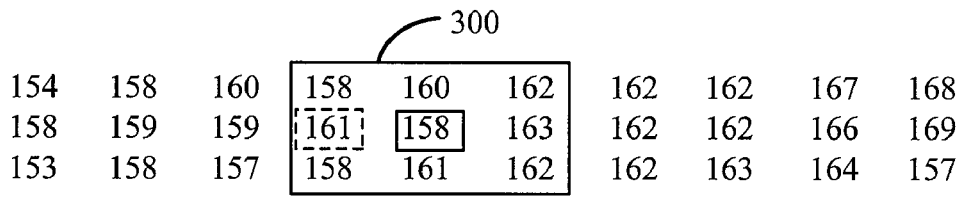
FIG. 7 is a diagram of a 3×3 window positioned during data embedding in accordance with one embodiment.
Figure 8:
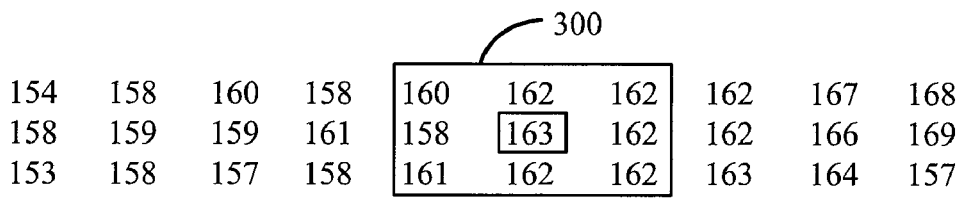
FIG. 8 is a diagram of a 3×3 window positioned during data embedding in accordance with one embodiment.

The window 300 is then slid to the fourth pixel 158, shown in FIG. 7. The prediction error $E_P=-3$, the fluctuation value $F=5>T_F$, hence this pixel is not selected. The window 300 is then slid to the fifth pixel 163, as shown in FIG. 8. The prediction error $E_P=2$, fluctuation value $F=12>T_F$, hence this pixel is not selected.

Figure 9:
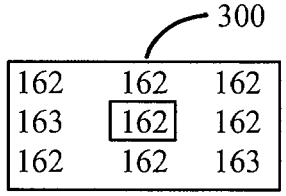
FIG. 9 is a diagram of a 3×3 window positioned during data embedding in accordance with one embodiment.

The window 300 is then slid to the sixth pixel 162, as shown in FIG. 9. The prediction error $E_P=0$, the fluctuation value $F=1<T_F$, then this pixel is selected for data embedding. According to the histogram pair method to embed data, since bit 0 is embedded, $E_P$ remains unchanged, i.e., $E_P \to 0$, the new pixel value is: 162→162.

Thus, during execution of the method in this example, all data (two bits) is embedded. The algorithm stops. This pixel is the strop point.

(2) Data Extraction

Data extraction is the reverse process of the data embedding and begins from the stop point, scanning the image from right to left and from bottom to top. If $F<T_F$, then this pixel is selected. The histogram pair method is used to recover this pixel and extract the hidden data. Otherwise, the pixel value is intact and the window moves to the next pixel. Accordingly, data extraction begins with the image shown in FIG. 9, which is the last image of the data embedding.

Figure 10:
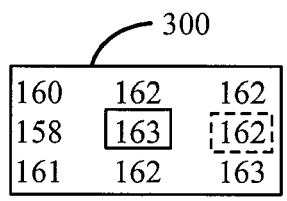
FIG. 10 is a diagram of a 3×3 window positioned at the end of data embedding and the beginning of data extraction in accordance with one embodiment.

The window 300 is slid to the stop point 162, shown in FIG. 10. The prediction error is found as $E_P=0$, the fluctuation value $F=1<T_F$. Hence this pixel is selected. According to the histogram pair method, bit 0 is extracted and the current center pixel value remains, i.e., the pixel value 162→162 is recovered. The window is then slid to the next left pixel Since $F=12>T_F$, the pixel is intact.

Figure 11:
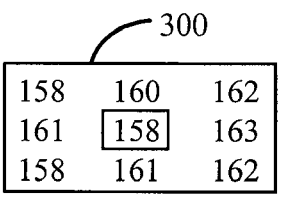
FIG. 11 is a diagram of a 3×3 window positioned during data extraction in accordance with one embodiment.
Figure 12:
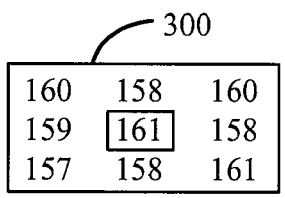
FIG. 12 is a diagram of a 3×3 window positioned during data extraction in accordance with one embodiment.
Figure 13:
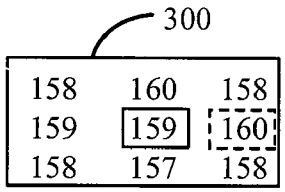
FIG. 13 is a diagram of a 3×3 window positioned during data extraction in accordance with one embodiment.

The window is then slid to the next pixel, shown in FIG. 11. The computation gives $F=5>T_F$, the pixel value is intact. The window 300 is then slide to the left, shown in FIG. 12. Since $F=1<T_F$, this pixel is selected. Because $E_P=2$, according to the histogram pair method, $E_p \to 1$, and 161→160, as shown in FIG. 13. The window is then slid to the next pixel. Since F=6>T, the pixel is intact.

Figure 14:
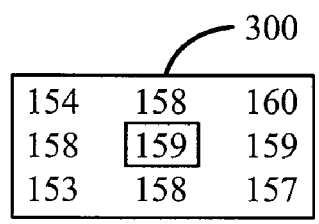
FIG. 14 is a diagram of a 3×3 window positioned during data extraction in accordance with one embodiment.
Figure 15:
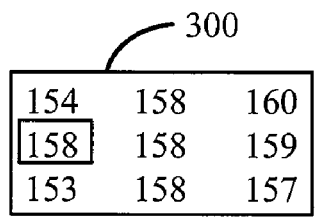
FIG. 15 is a diagram of a 3×3 window positioned during data extraction in accordance with one embodiment.

The window is slid to the next left pixel, shown in FIG. 14. Since $F=1<T_F$, then this pixel is selected. Because $E_P=1$, according to the histogram pair method, $E_P \to 0$, i.e., 159→158, and bit 1 is extracted, as shown by FIG. 15.

Because the window 300 has reached the beginning position on the image, the data extraction stops. The exact original image is recovered and the hidden data is extracted.

As shown in the sequence of FIGS. 4 through 15, the fluctuation value F remains unchanged after data embedding and before data extraction. This indicates that it is straightforward to detect which pixel has been selected or not for data embedding during the data recovery process. Hence the marked image can be losslessly recovered. In this example, no bookkeeping data is needed for extraction.

Histogram Modification

For the sake of brevity, underflow and/or overflow are referred to in the following discussion as overflow. Thus, while the term "overflow" may be used, it is intended to be inclusive of the term "underflow". In order to address the issue of overflow, histogram modification may be used, such as by using histogram pairs. Reference is made to "Optimum histogram pair based image lossless data embedding" and "Reversible data hiding for JPEG images based on histogram pairs," both herein incorporated by reference in their entireties, for further details regarding optimum histogram pair methodology. G. Xuan, Y. Q. Shi, P. Chai, X. Cui, Z. Ni, X. Tong, International Workshop on Digital Watermarking (IWDW07), 3-5 Dec. 2007, Ghangzhou, China; and G. Xuan, Y. Q. Shi, Z. Ni, P. Chai, X. Cui, and X. Tong, International Conference on Image Analysis and Recognition (ICIAR07), Aug. 22-24, 2007, Montreal, Canada. In alternative embodiments, other methods of addressing overflow may be used including other methods of histogram modification.

With the embedding threshold, only partial prediction error values whose value is equal to or less than the embedding threshold are considered for using to embed data in order to make the PSNR high with a given data embedding capacity. During the data embedding, overflow may occur, meaning that the new pixel value after data embedding is beyond the range of [0,255]. When overflow is detected, depending on it is overflow, underflow or both, the right end, left end, or both ends of the histogram is narrowed down towards the center, and the corresponding bookkeeping information of histogram modification is recorded as bookkeeping data, which is to be embedded into the image together with the pure payload. During the data extraction, the bookkeeping data is extracted as well and hence the original image can be recovered. In Tables 1-3, the parameters of histogram modification is reported, where GL stands for how many grayscale values from the left end have been shrunk and GR for how many grayscale values from the right end have been shrunk.

As shown, the location map is two-dimensional while histogram shrinking is one-dimensional in nature. Hence, the amount of bookkeeping data with location map is often larger than that of histogram shrinking in general.

In alternative embodiments, histogram shrinking (or other histogram modification) may be implemented by using the reverse process of histogram pair embedding. Histogram pair embedding generally makes the image prediction-error histogram more flat, while histogram shrinking makes image grayscale histogram less flat. Thus, methods of histogram pair reversible data hiding may be used for histogram shrinking. For the image histograms where both ends are of high peak, some middle position may be shrunk first to implement histogram shrinking in order to reduce the amount of bookkeeping data and finally enhance the payload-PSNR performance.

EXAMPLES

Figure 16A:
FIG. 16a is a first image for image data hiding.
Figure 16B:
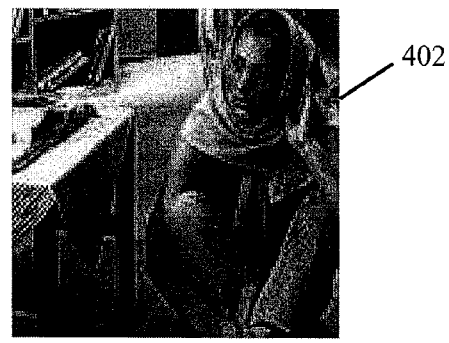
FIG. 16b is a second image for image data hiding.
Figure 16C:
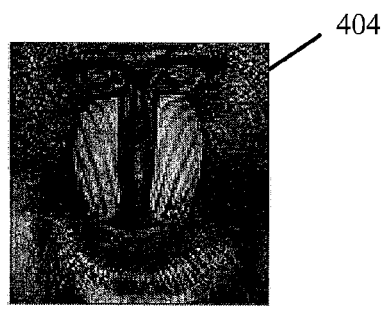
FIG. 16c is a third image for image data hiding.

The reversible image data hiding method was performed on four sample images. The sample images are shown in FIG. 16a-16d and include Lena 400 of FIG. 16a, Barbara 402 of FIG. 16b, Baboon 404 of FIG. 16c, and Woman 406 of FIG. 16d. It is noted that the images 400, 402, 404 of FIGS. 16a-16c are standard images used in assessing reversibility of data hiding techniques. The image of 16d, Woman 406, is a new image used for the purposes of assessing the technique described herein. As will be described more fully below, the Woman image 406 varies in several respects from the images 400, 402, 404 of FIGS. 16a-16c.

FIGS. 17a-17d illustrate histograms 410, 412, 414, 416 of each of the images 400, 402, 404, 406 of FIGS. 16a-16d, respectively. In order to prevent overflow (underflow and/or overflow) at a required pure data embedding rate, the image histogram may be modified. Such modification may comprise, for example, shrinking of the image towards the center. Specifically, when underflow and/or overflow are/is detected, in some embodiments, the scheme starts to shrink the histogram range and the corresponding bookkeeping data is embedded into the image. For many natural images, for example the commonly used images 400, 402, 404 of FIGS. 16a-16c, the experimental results demonstrate that histogram modification is not necessary when the payload is not beyond a certain pure data embedding rate.

Figure 16D:
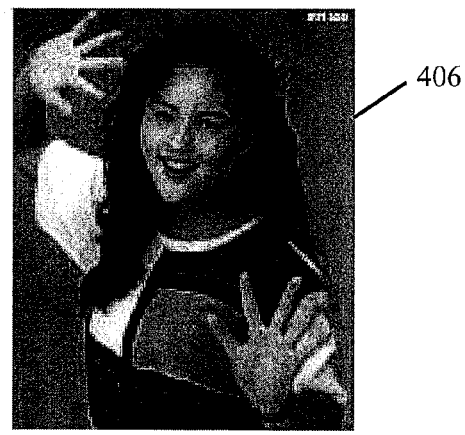
FIG. 16d is a fourth image for image data hiding.
Figure 17A:
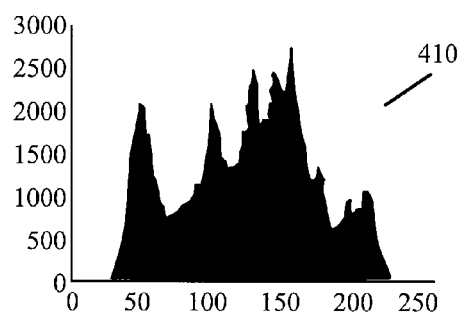
Figure 17C:
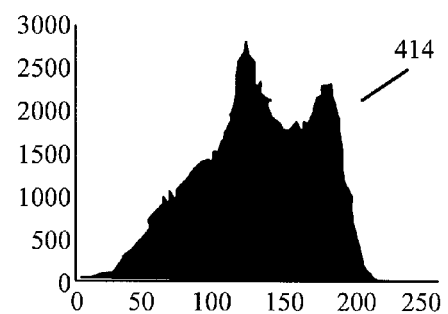
FIG. 17c is a histogram of the image of FIG. 16c.
Figure 17B:
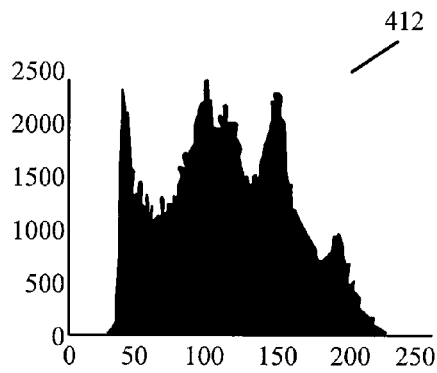
FIG. 17b is a histogram of the image of FIG. 16b.
Figure 17D:
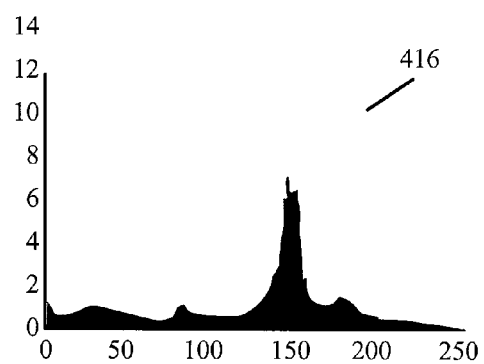
FIG. 17d is a histogram of the image of FIG. 16d.

The image 406 shown in FIG. 16d varies from the commonly used images 400, 402, 404 of FIGS. 16a-16c. As shown in FIG. 17d, the histogram 416 of Woman 406 has peaks at both grayscale values 0 and 255. In contrast, as shown in FIGS. 17a-17c, the histograms 410, 412, 414 of the three frequently used images 400, 402, 404 do not have these two end values occupied. As shown, methods of reversible image data hiding as taught herein are effective for images having peaks at both grayscale values 0 and 255, such as the Woman image 406.

Figure 18:
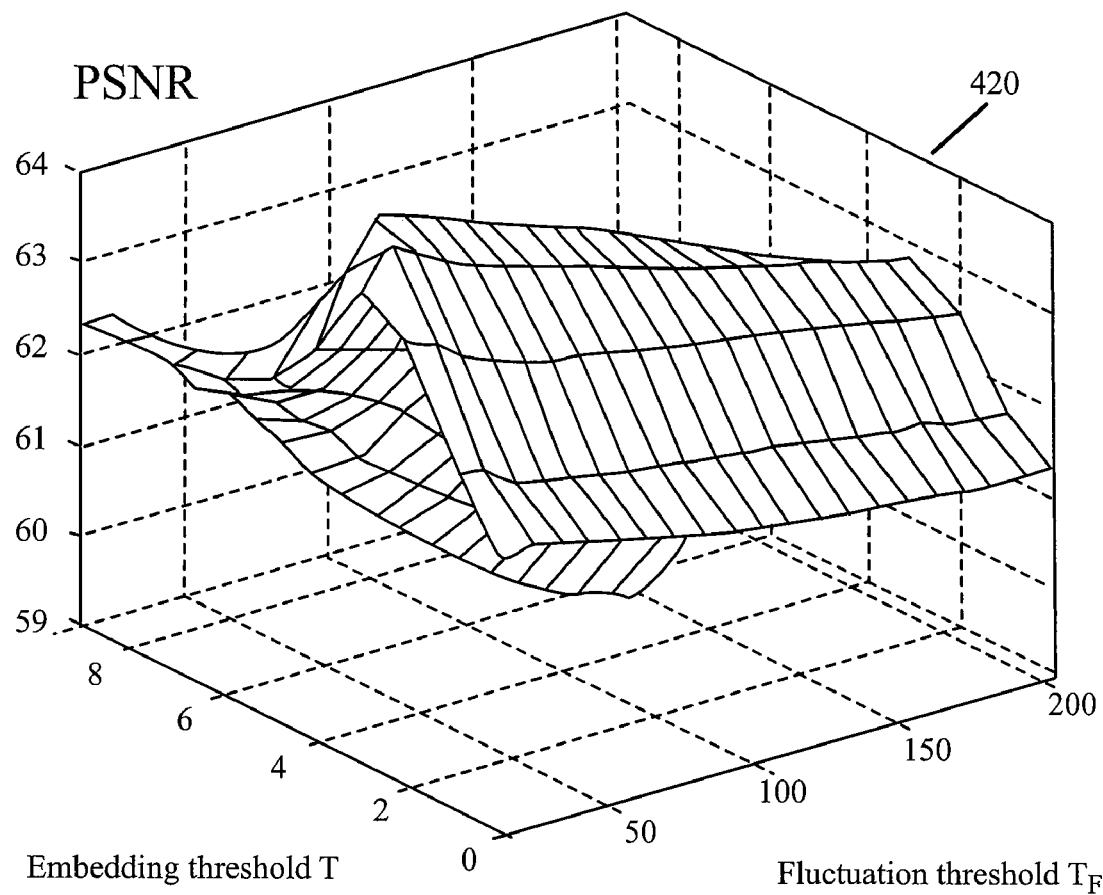
FIG. 18 is a diagram of an optimality search performed on the image of FIG. 16b.

FIG. 18 displays a graph 420 of an optimality search conducted on 512×512 Barbara image. The pure data embedding rate is 0.02 bpp. Data embedding may begin with −T=−4, by the t sequence −4,3. It is shown computational search leads to the highest PSNR=64.7880 when $T_F$=24, and T=4. The GL=0, GR=0, hence bookkeeping data is not needed. This example illustrates the concept of optimality and the feasibility of proposed computation search, refer to Table 2 for detail.

Experimental results for each of the images of 16a-16d are shown in FIGS. 19a-22b. For each Figure, a of the Figure comprises a graph 430, 432, 434, 436 of the performance comparison on the image in terms of pure data embedding rate versus PSNR of marked image among several recently reported reversible data hiding schemes and b of the Figure illustrates a table of experimental results with parameters.

Figures 19A, 19B:
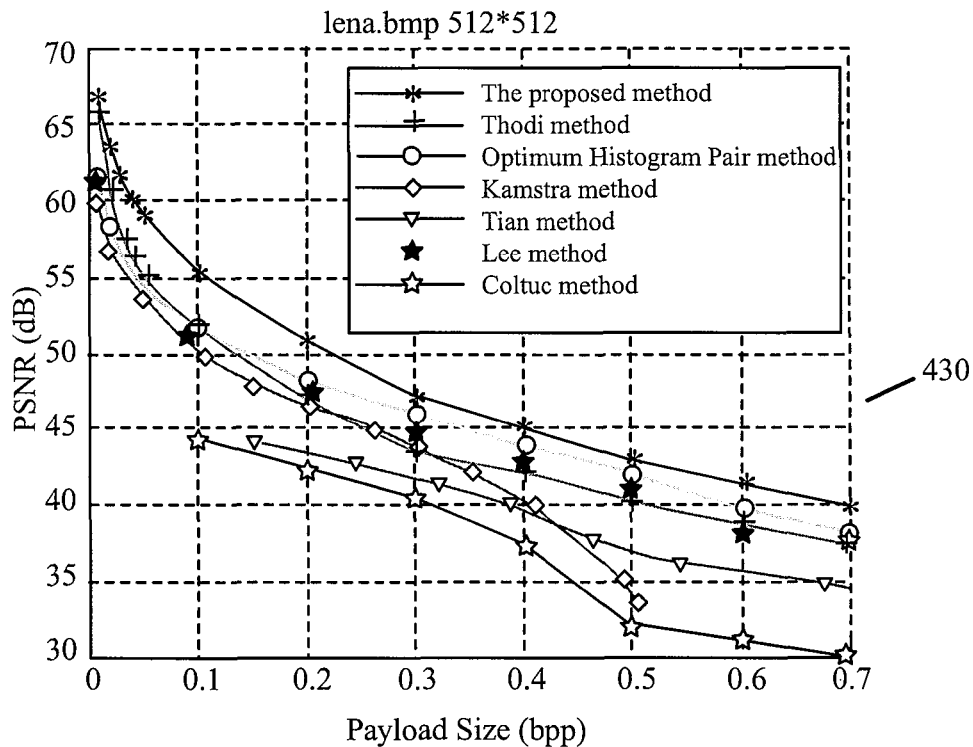

FIGS. 19a and 19b illustrate the experimental results for the Lena image 400 of FIG. 16a. As may be observed from the table of FIG. 19b, the pure embedding rate is 0.01 bpp, the fluctuation threshold $T_F$=18, the embedding threshold T=5. Data embedding starts at T=5. Because the to be embedded data sequence cannot be all embedded at T=5, the data embedding continues at −4. That is, T=5, S=−4, where T is also referred to as starting point for data embedding, while S stands for stopping point. The data embedding sequences starts from T and ends at S, in which the magnitude of the sequence 5, −4 monotonically non-increasing, and plus and minus alternate, and is called t sequence. In this case, t sequence is: 5, −4. The second row of the Table of FIG. 19b, shows that T=−4, and S=3, t sequence is −4,3, which does have magnitude monotonically non-increasing, and minus and plus alternating.

Figures 20A, 20B:
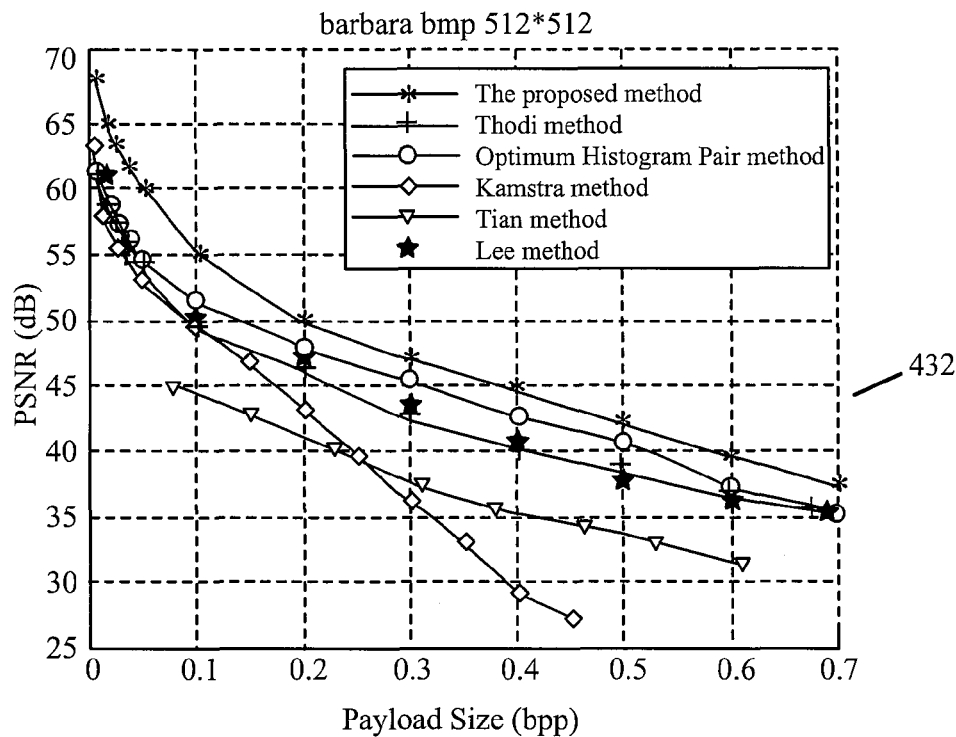
FIG. 20a is a graph of the performance comparison on the image in terms of pure data embedding rate versus PSNR of marked image among several recently reported reversible data hiding schemes for the image of FIG. 16b.
FIG. 20b is a table showing experimental results and parameters for the image of FIG. 16b.
Figures 21A, 21B:
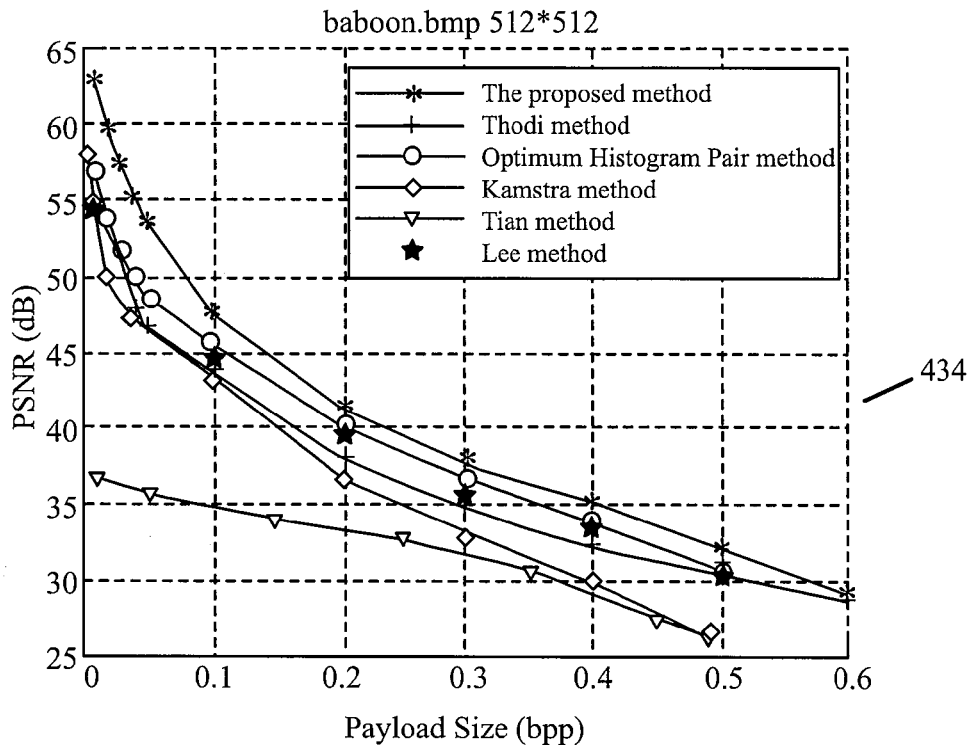
FIG. 21a is a graph of the performance comparison on the image in terms of pure data embedding rate versus PSNR of marked image among several recently reported reversible data hiding schemes for the image of FIG. 16c.
FIG. 21b is a table showing experimental results and parameters for the image of FIG. 16c.
Figures 22A, 22B:
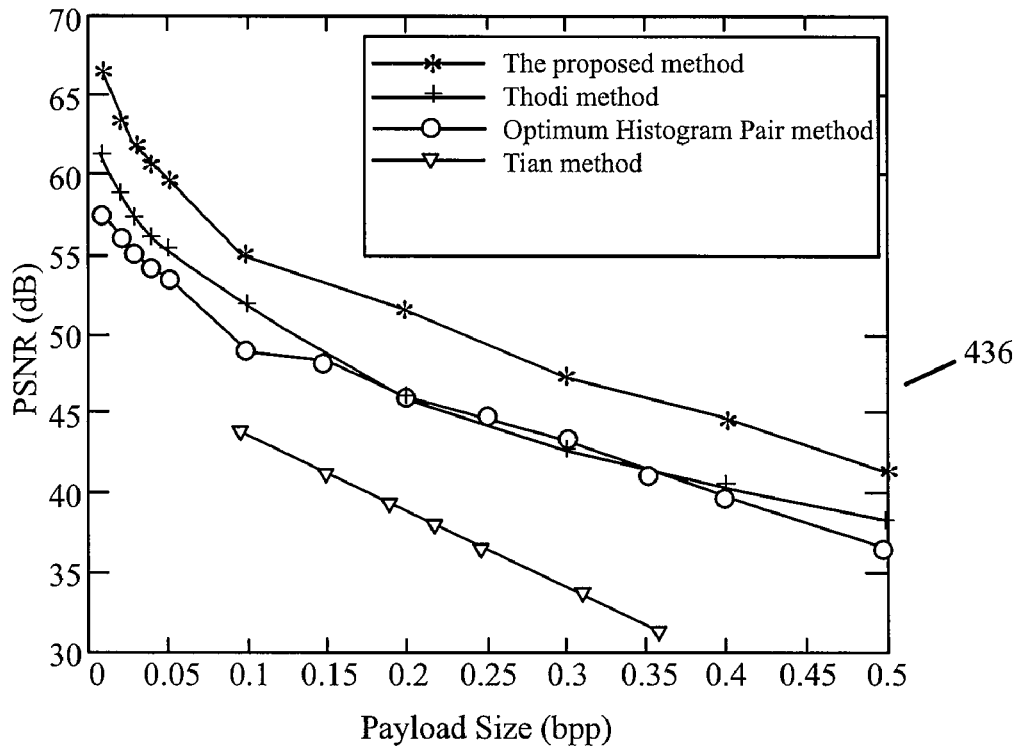
FIG. 22a is a graph of the performance comparison on the image in terms of pure data embedding rate versus PSNR of marked image among several recently reported reversible data hiding schemes for the image of FIG. 16d.
FIG. 22b is a table showing experimental results and parameters for the image of FIG. 16d.
Figure 1B:
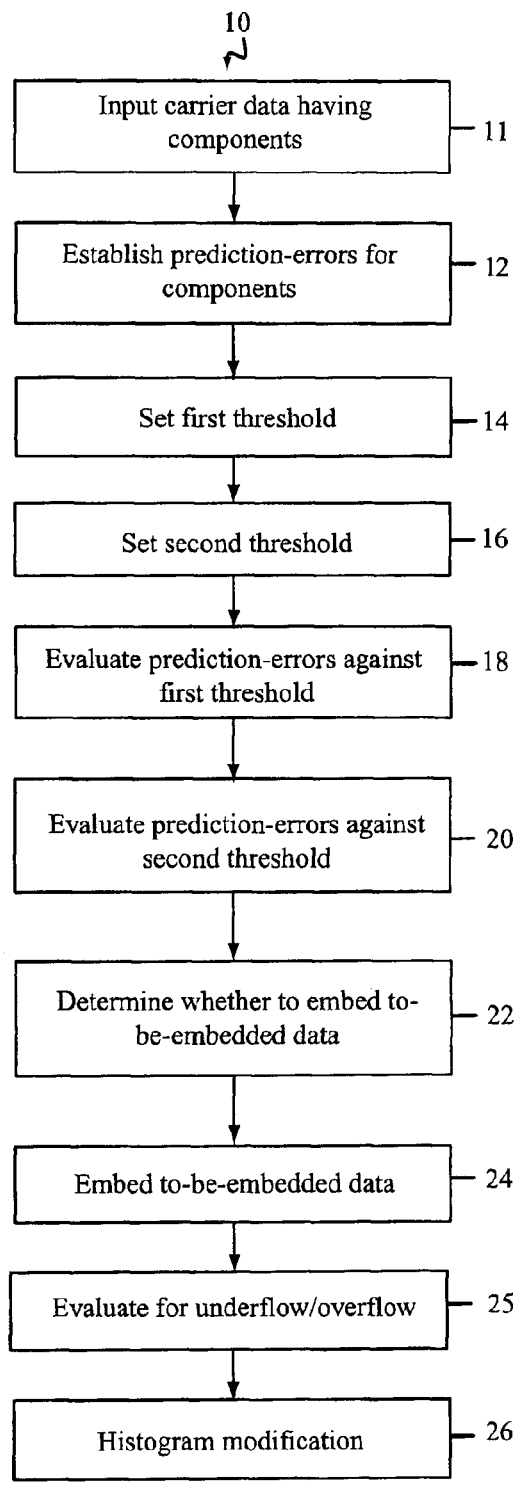
Figure 1C:
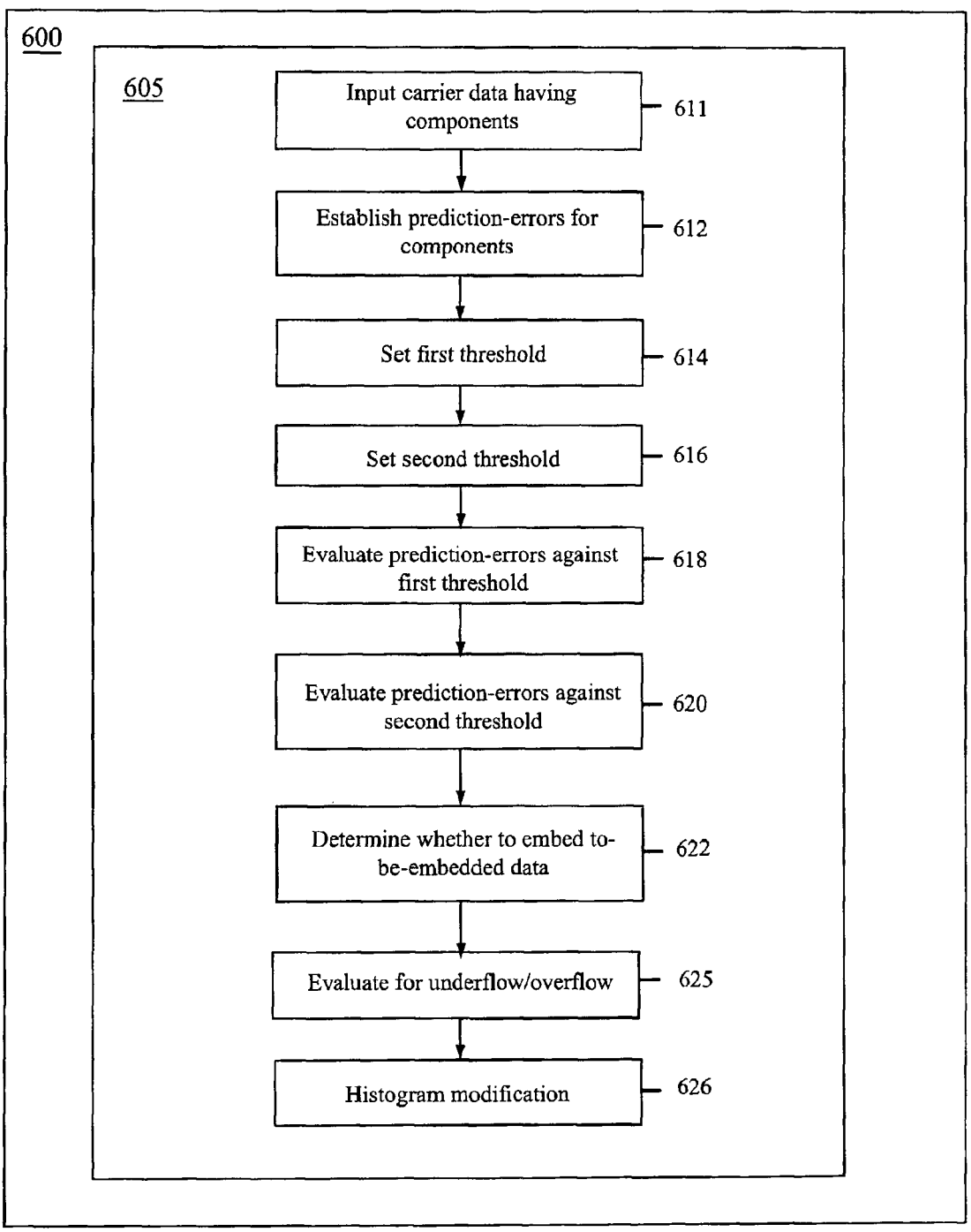

FIGS. 20a and 20b illustrate the experimental results for the Barbara image 402 of FIG. 16b. FIGS. 21a and 21b illustrate the experimental results for the Baboon image 404 of FIG. 16c. FIGS. 22a and 22b illustrate the experimental results for the Woman image 406 of FIG. 16c.

The tables of FIGS. 19b, 20b, and 21b, GL and GR are the final results of spatial domain histogram shrinking to avoid overflow. GL is the amount of grayscale values shrinking at the left side towards the center, while GR is the amount from the right side. It is noted that the total amount of histogram shrinkage G is the sum of GL and GR, i.e., G=GL+GR.

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods, reagents, compounds compositions or biological systems, which can, of course, vary. It is also to be understood that the terminology used herein is for the purpose of describing particular embodiments only, and is not intended to be limiting.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," "greater than," "less than," and the like include the number recited and refer to ranges which can be subsequently broken down into subranges as discussed above. Finally, as will be understood by one skilled in the art, a range includes each individual member. Thus, for example, a group having 1-3 cells refers to groups having 1, 2, or 3 cells. Similarly, a group having 1-5 cells refers to groups having 1, 2, 3, 4, or 5 cells, and so forth.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

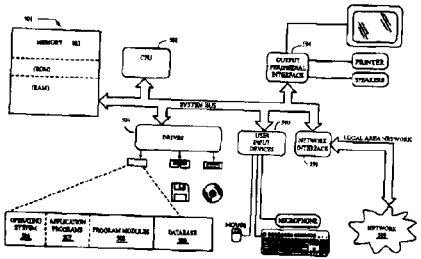

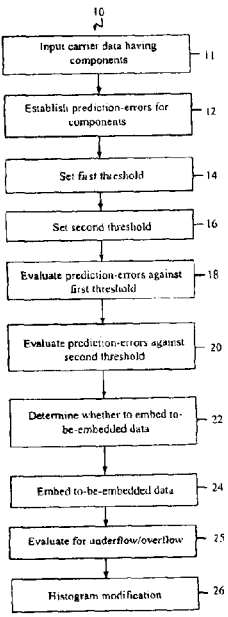

The invention claimed is:

1. A method for reversible data hiding comprising:
   identifying carrier data having a plurality of components;
   establishing prediction-errors for each of the components of the carrier data;
   setting first threshold;
   setting second threshold;
   evaluating the prediction-errors of the components against the first threshold to identify components for possible hiding;
   evaluating components identified for possible hiding against the second threshold to identify components for hiding;
   embedding to-be-embedded-data in the components identified for hiding to create marked data;
   evaluating the marked data for overflow or underflow; and
   modifying histogram if overflow or underflow is detected.

2. The method of claim 1, wherein the carrier data is an image.

3. The method of claim 2, wherein the components are pixels.

4. The method of claim 1, wherein the first threshold is an embedding threshold.

5. The method of claim 4, wherein the embedding threshold is applied to magnitude of prediction-errors.

6. The method of claim 5, wherein evaluating the prediction-errors against the embedding threshold identifies only those components whose prediction-errors have a magnitude that does not exceed the embedding threshold.

7. The method of claim 1, wherein the second threshold is a fluctuation threshold.

8. The method of claim 7, wherein the fluctuation threshold is applied to magnitude of neighborhood fluctuation.

9. The method of claim 8, wherein evaluating against the fluctuation threshold identifies only those components whose prediction-errors have an associated neighborhood-fluctuation value that does not exceed the fluctuation threshold.

10. The method of claim 1, wherein modifying the histogram comprises shrinking the histogram if overflow and/or underflow is detected.

11. A method for reversible data hiding for an image comprising:
- identifying a carrier image having pixels;
- developing prediction-errors for each pixel;
- determining a fluctuation threshold;
- determining an embedding threshold;
- evaluating neighborhood fluctuation associated with the prediction-errors of the pixels against the fluctuation threshold;
- evaluating the prediction-errors of the pixels against the embedding threshold;
- embedding to-be-embedded data at the pixels based on evaluation of prediction-error; and
- creating a marked image when the to-be-embedded data is embedded into the carrier image.

12. The method of claim 11, further comprising evaluating whether the embedding threshold is under maximizing PSNR for a given pure payload and, if the embedding threshold is not under maximizing PSNR, setting a new embedding threshold.

13. The method of claim 11, further comprising evaluating whether the fluctuation threshold is under maximizing PSNR for a given pure payload, if the fluctuation threshold is not under maximizing PSNR, setting a new fluctuation threshold.

14. The method of claim 11, wherein embedding to-be-embedded data at the pixels creates marked data and further comprising evaluating the marked data for underflow or overflow.

15. The method of claim 14, further comprising histogram modification if underflow or overflow is detected.

16. The method of claim 15, wherein histogram modification comprises histogram shrinking.

17. The method of claim 16, wherein histogram modification is done by optimum histogram pair methodology.

18. The method of claim 11, wherein the embedding threshold is applied to magnitude of prediction-errors and selects only those prediction-errors whose magnitude does not exceed the embedding threshold.

19. The method of claim 11, wherein the fluctuation threshold is applied to magnitude of neighborhood fluctuation and wherein evaluating prediction-errors against the fluctuation threshold selects only those prediction-errors whose magnitude of neighborhood fluctuation does not exceed the fluctuation threshold.

20. A computer accessible medium having stored thereon computer executable instructions for processing an image when the executable instruction are executed by a processing unit, configuring the processing unit to perform a procedure comprising:
- identifying a carrier image having pixels;
- developing prediction-errors for the pixels of the carrier image;
- determining a fluctuation threshold;
- determining an embedding threshold;
- evaluating neighborhood fluctuation associated with the prediction-errors of the pixels against the fluctuation threshold;
- evaluating the prediction-errors of the pixels against the embedding threshold;
- embedding to-be-embedded-data based on evaluating the neighborhood fluctuation and evaluating the prediction-errors, thereby creating marked data; and
- creating a marked image when the to-be-embedded data is embedded into the carrier image.

21. The computer accessible medium of claim 10, further comprising instructions for converting the marked image back to the carrier image.

* * * * *

UNITED STATES PATENT AND TRADEMARK OFFICE
CERTIFICATE OF CORRECTION

PATENT NO. : 8,175,324 B2
APPLICATION NO. : 12/253825
DATED : May 8, 2012
INVENTOR(S) : Xuan et al.

It is certified that error appears in the above-identified patent and that said Letters Patent is hereby corrected as shown below:

The Title Page should be deleted and substitute therefor the attached title page.

On the Title Page, Item (56), under "OTHER PUBLICATIONS", in Column 1, Line 1, delete "Hisotgram" and insert -- Histogram --, therefor.

On the Title Page, Item (56), under "OTHER PUBLICATIONS", in Column 1, Line 2, delete "al ;" and insert -- al.; --, therefor.

On the Title Page, Item (56), under "OTHER PUBLICATIONS", in Column 1, Line 3, delete "hiding ; Zhicheng et al;" and insert -- hiding; Zhicheng et al.; --, therefor.

On the Title Page, Item (56), under "OTHER PUBLICATIONS", in Column 2, Line 7, delete "Proceeings" and insert -- Proceedings --, therefor.

On the Title Page, in the Figure, delete " 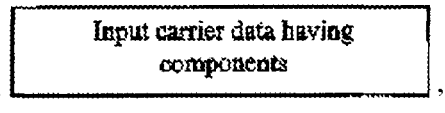 " and insert -- 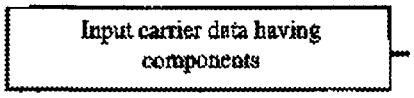 --, therefor.

On the Title Page, in the Figure, delete Tag "11" and insert Tag -- 12 --, therefor.

On the Title Page, in the Figure, delete Tag "12" and insert Tag -- 14 --, therefor.

On the Title Page, in the Figure, delete Tag "14" and insert Tag -- 16 --, therefor.

On the Title Page, in the Figure, delete Tag "16" and insert Tag -- 18 --, therefor.

Signed and Sealed this
Thirtieth Day of July, 2013

Teresa Stanek Rea
*Acting Director of the United States Patent and Trademark Office*

CERTIFICATE OF CORRECTION (continued)
U.S. Pat. No. 8,175,324 B2

On the Title Page, in the Figure, delete Tag "18" and insert Tag -- 20 --, therefor.

On the Title Page, in the Figure, delete Tag "20" and insert Tag -- 22 --, therefor.

On the Title Page, in the Figure, delete Tag "22" and insert Tag -- 24 --, therefor.

On the Title Page, in the Figure, delete Tag "24" and insert Tag -- 25 --, therefor.

On Title Page 2, Item (56), under "OTHER PUBLICATIONS", in Column 1, Line 17, after "techniques,"" delete "International,".

On Title Page 2, Item (56), under "OTHER PUBLICATIONS", in Column 2, Line 14, delete "date" and insert -- data --, therefor.

In the Drawings:

In Fig. 1b, Sheet 2 of 15, delete " [Input carrier data having components] " and insert -- [Input carrier data having components] -- 11 --, therefor.

In Fig. 1b, Sheet 2 of 15, delete Tag "11" and insert Tag -- 12 --, therefor.

In Fig. 1b, Sheet 2 of 15, delete Tag "12" and insert Tag -- 14 --, therefor.

In Fig. 1b, Sheet 2 of 15, delete Tag "14" and insert Tag -- 16 --, therefor.

In Fig. 1b, Sheet 2 of 15, delete Tag "16" and insert Tag -- 18 --, therefor.

In Fig. 1b, Sheet 2 of 15, delete Tag "18" and insert Tag -- 20 --, therefor.

In Fig. 1b, Sheet 2 of 15, delete Tag "20" and insert Tag -- 22 --, therefor.

In Fig. 1b, Sheet 2 of 15, delete Tag "22" and insert Tag -- 24 --, therefor.

In Fig. 1b, Sheet 2 of 15, delete Tag "24" and insert Tag -- 25 --, therefor.

In Fig. 1c, Sheet 3 of 15, delete " [Input carrier data having components] " and insert -- [Input carrier data having components] -- 611 --, therefor.

CERTIFICATE OF CORRECTION (continued)
U.S. Pat. No. 8,175,324 B2

In Fig. 1c, Sheet 3 of 15, delete Tag "611" and insert Tag -- 612 --, therefor.

In Fig. 1c, Sheet 3 of 15, delete Tag "612" and insert Tag -- 614 --, therefor.

In Fig. 1c, Sheet 3 of 15, delete Tag "614" and insert Tag -- 616 --, therefor.

In Fig. 1c, Sheet 3 of 15, delete Tag "616" and insert Tag -- 618 --, therefor.

In Fig. 1c, Sheet 3 of 15, delete Tag "618" and insert Tag -- 620 --, therefor.

In Fig. 1c, Sheet 3 of 15, delete Tag "620" and insert Tag -- 622 --, therefor.

In Fig. 1c, Sheet 3 of 15, delete Tag "624" and insert Tag -- 625 --, therefor.

In the Specifications

In Column 1, Line 13, delete "(HVS)," and insert -- (HVSs), --, therefor.

In Column 2, Line 7, delete "J Chen, J Zhu," and insert -- J. Chen, J. Zhu, --, therefor.

In Column 2, Line 16, delete "Y Q." and insert -- Y. Q. --, therefor.

In Column 2, Line 18, delete "vol 2," and insert -- vol. 2, --, therefor.

In Column 2, Line 22, delete "Y Zheng," and insert -- Y. Zheng, --, therefor.

In Column 2, Lines 47-48, delete "Y Q. Shi, P. Chai, X Cui, Z. Ni, X Tong," and insert -- Y. Q. Shi, P. Chai, X. Cui, Z. Ni, X. Tong, --, therefor.

In Column 2, Line 51, delete "Y Q. Shi, Z. Ni, P. Chai, X Cui, and X" and insert -- Y. Q. Shi, Z. Ni, P. Chai, X. Cui, and X. --, therefor.

In Column 3, Lines 21-22, delete "the whose" and insert -- whose --, therefor.

In Column 8, Line 43, delete "626]" and insert -- 626]. --, therefor.

In Column 9, Line 29, delete "EP" and insert -- $E_P$ --, therefor.

In Column 12, Line 56, delete "EP" and insert -- $E_P$ --, therefor.

In Column 13, Line 42, delete "EP" and insert -- $E_P$ --, therefor.

(12) United States Patent
Xuan et al.

(10) Patent No.: US 8,175,324 B2
(45) Date of Patent: May 8, 2012

(54) REVERSIBLE DATA HIDING

(75) Inventors: Guorong Xuan, Shanghai (CN); Yun-Qing Shi, Millburn, NJ (US)

(73) Assignee: New Jersey Institute of Technology, Newark, NJ (US)

(*) Notice: Subject to any disclaimer, the term of this patent is extended or adjusted under 35 U.S.C. 154(b) by 873 days.

(21) Appl. No.: 12/253,825

(22) Filed: Oct. 17, 2008

(65) Prior Publication Data
US 2010/0098287 A1 Apr. 22, 2010

(51) Int. Cl.
*G06K 9/00* (2006.01)
(52) U.S. Cl. ........ 382/100; 382/232; 382/251; 382/169; 382/235; 382/248
(58) Field of Classification Search ........ 382/100, 382/232, 251, 169, 235, 162, 248
See application file for complete search history.

(56) References Cited

U.S. PATENT DOCUMENTS

| | | | |
|---|---|---|---|
| 6,463,100 B1* | 10/2002 | Cho et al. | 375/240.03 |
| 6,975,733 B1* | 12/2005 | Choi et al. | 381/100 |
| 6,983,057 B1* | 1/2006 | Ho et al. | 382/100 |
| 7,280,669 B2* | 10/2007 | Choi et al. | 382/100 |
| 7,555,137 B2* | 6/2009 | Parisis et al. | 382/100 |
| 2005/0141747 A1* | 6/2005 | Shi et al. | 382/100 |
| 2006/0002584 A1* | 1/2006 | Lu | 382/100 |
| 2007/0189608 A1* | 8/2007 | Shi et al. | 382/224 |
| 2007/0258618 A1* | 11/2007 | Shi et al. | 382/100 |

OTHER PUBLICATIONS

Reversible Binary Image Data Hiding by Run Length Hisotgram Modification; Xuan et al; Dec. 8, 2008.*
Reversible Data hiding ; Zhicheng et al; Mar. 2006.*
Shi, Y.Q. "Reversible data hiding" International Workshop on Digital watermarking (IWDW04), Seoul, Korea, Oct. 2004.
Tian, J. "Reversible data embedding using a difference expansion," IEEE Transaction on Circuits and Systems for Video Technology, 2003, 13 (8):890-896.
Alattar, A. M. "Reversible watermark using difference expansion of triplets," Proceeings of the International Conference on Image Processing, vol. 1, pp. 501-504, 2003.
Thodi et al. "Reversible watermarking by prediction-error expansion," Proceedings of 6th IEE Southwest Symposium on Image Analysis and Interpretation, pp. 21-25, Lake Tahoe, CA, USA, Mar. 28-30, 2004.
Kamstra et al., "Reversible data embedding into images using wavelet techniques and sorting," IEEE Transactions on Image Processing, vol. 14, No. 12, pp. 2082-2090. Dec. 2005.

(Continued)

*Primary Examiner* — Vikkram Bali
*Assistant Examiner* — Nancy Bitar
(74) *Attorney, Agent, or Firm* — Dorsey & Whitney LLP

(57) ABSTRACT

Methods for reversible data hiding are disclosed herein. These methods may be applied to images for reversible image data hiding. In one embodiment, a method for reversible data hiding comprises identifying carrier data having a plurality of components and establishing prediction-errors for each of the components of the carrier data. A first threshold and a second threshold are established. The prediction-errors of the components are evaluated against the first threshold to identify components for possible hiding. The components identified for possible hiding are evaluated against the second threshold to identify components for hiding. To-be embedded data is embedded into the carrier data identified for hiding to create marked data. The marked data is evaluated for overflow or underflow. If overflow or underflow is detected, histogram modification is performed. Marked data is then established.

21 Claims, 15 Drawing Sheets